United States Patent [19]

Oota

[11] Patent Number: 5,090,389
[45] Date of Patent: Feb. 25, 1992

[54] FUEL DELIVERY CONTROL APPARATUS FOR ENGINE OPERABLE ON GASOLINE/ALCOHOL FUEL BLEND

[75] Inventor: Tadaki Oota, Fujisawa City, Japan
Kugenumahigashi, Fujisawa City,

[73] Assignee: Nissan Motor Company, Ltd., Japan

[21] Appl. No.: 593,404

[22] Filed: Oct. 5, 1990

[30] Foreign Application Priority Data

Oct. 9, 1989 [JP] Japan .................. 1-262249
Oct. 9, 1989 [JP] Japan .................. 1-262250
Oct. 11, 1989 [JP] Japan .................. 1-262984
Dec. 7, 1989 [JP] Japan .................. 1-316465

[51] Int. Cl.$^5$ ................ F02D 41/04; F02D 41/14
[52] U.S. Cl. .................... 123/489; 123/1 A; 123/494; 123/479; 123/179.17
[58] Field of Search ........... 123/1 A, 179 G, 179 L, 123/478, 479, 480, 486, 489, 494; 364/431.05

[56] References Cited

U.S. PATENT DOCUMENTS

| | | | |
|---|---|---|---|
| 4,391,253 | 7/1983 | Ito | 123/478 |
| 4,495,930 | 1/1985 | Nakajima | 123/478 X |
| 4,546,732 | 10/1985 | Mae et al. | 123/1 A |
| 4,706,629 | 11/1987 | Wineland et al. | 123/478 |
| 4,706,630 | 11/1987 | Wineland et al. | 123/478 |
| 4,945,880 | 8/1990 | Gonze et al. | 123/478 |
| 4,957,087 | 9/1990 | Ota | 123/479 |
| 4,967,714 | 11/1990 | Inoue | 123/489 |

FOREIGN PATENT DOCUMENTS

56-98540 8/1981 Japan .

*Primary Examiner*—Willis R. Wolfe
*Attorney, Agent, or Firm*—Lowe, Price, LeBlanc, Becker & Shur

[57] ABSTRACT

A fuel delivery control apparatus for use with an engine operable on either of gasoline fuel and gasoline/alcohol fuel blend. The amount of fuel metered to the engine is controlled based upon engine operating conditions. A first correction factor is set at a value calculated based upon a signal from an alcohol concentration sensor to correct the amount of fuel metered to the engine. A second correction factor is set based upon a signal from an oxygen sensor to correct the amount of fuel metered to the engine so as to provide an air/fuel ratio feedback control. In the event of failure of the alcohol concentration sensor, the first correction factor is estimated by modifying it based upon the signal from the oxygen sensor and a difference between the calculated and estimated values of the first correction factor is calculated. The first correction factor is set at the estimated value when the calculated difference is out of a predetermined range and at the calculated value when the calculated difference is within the acceptable range.

31 Claims, 15 Drawing Sheets

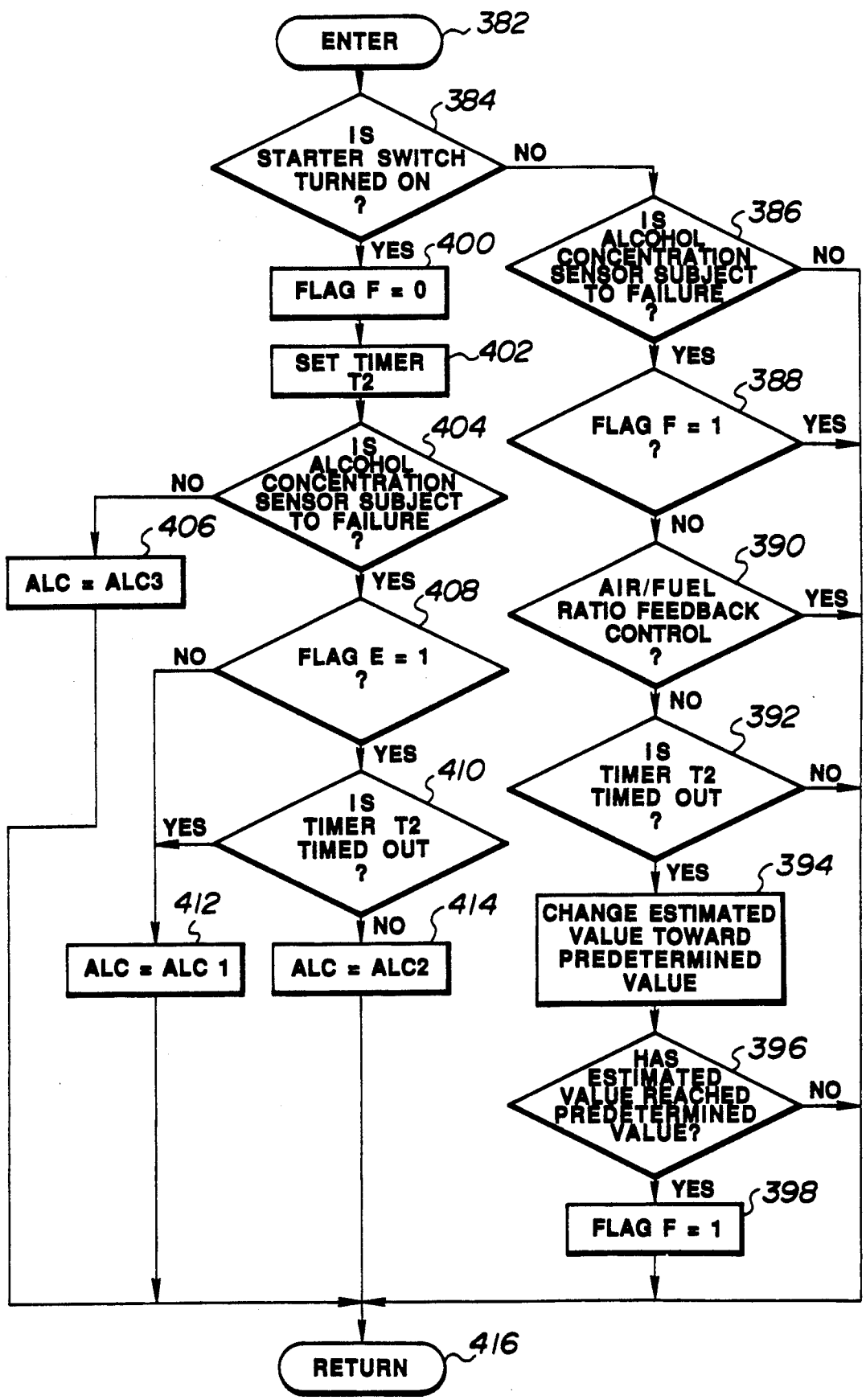

5,090,389

FUEL DELIVERY CONTROL APPARATUS FOR ENGINE OPERABLE ON GASOLINE/ALCOHOL FUEL BLEND

BACKGROUND OF THE INVENTION

This invention relates to a fuel delivery control apparatus for controlling an internal combustion engine operable on gasoline fuel or gasoline/alcohol fuel blend particularly in the event of failure of an alcohol concentration sensor or its associated circuit.

For example, Japanese Patent Kokai No. 56-98540 discloses an apparatus for controlling an internal combustion engine operable on gasoline fuel or gasoline/alcohol fuel blend. The engine control apparatus employs an alcohol concentration sensor sensitive to the alcohol concentration of the fuel delivered to the engine. The sensed alcohol concentration is used to control the amount of fuel metered to the engine.

With such a conventional engine control apparatus, however, the engine cannot operate in a stable manner in the event of failure of the alcohol concentration sensor or its associated circuit.

SUMMARY OF THE INVENTION

Therefore, it is a main object of the invention to provide a fuel delivery control apparatus which can continue smooth and stable engine operation in the event of failure of an alcohol concentration sensor or its circuit used to sense the alcohol concentration of the fuel delivered to the engine.

There is provided, in accordance with the invention, a fuel delivery control apparatus for use with an internal combustion engine operable on either of gasoline fuel and gasoline/alcohol fuel blend. The fuel delivery control apparatus comprises an alcohol concentration sensor sensitive to an alcohol concentration of the fuel to be delivered to the engine for producing an alcohol concentration signal indicative of a sensed alcohol concentration, an oxygen sensor sensitive to an oxygen content of exhaust gases discharged from the engine for producing an air-fuel ratio feedback signal, and a control unit coupled to the alcohol concentration sensor and the oxygen sensor for controlling the amount of fuel metered to the engine based upon engine operating conditions. The control unit includes first means for setting a first correction factor at a value calculated based upon the alcohol concentration signal to correct the amount of fuel metered to the engine, second means for setting a second correction factor based upon the air/fuel ratio feedback signal to correct the amount of fuel metered to the engine so as to provide an air/fuel ratio feedback control, third means responsive to failure in the alcohol concentration sensor for producing a failure signal, and fourth means operable in response to the failure signal. The fourth means includes means for modifying the first correction factor based upon the air/fuel ratio feedback signal to estimate a value of the first correction factor, means for calculating a difference between the calculated and estimated values of the first correction factor, and means for setting the first correction factor at the estimated value to correct the amount of fuel metered to the engine when the calculated difference is out of a predetermined range and at the calculated value to correct the amount of fuel metered to the engine when the calculated difference is within the acceptable range.

In another aspect of the invention, there is provided a fuel delivery control apparatus for use with an internal combustion engine operable on either of gasoline fuel and gasoline/alcohol fuel blend. The fuel delivery control apparatus comprises an alcohol concentration sensor sensitive to an alcohol concentration of the fuel to be delivered to the engine for producing an alcohol concentration signal indicative of a sensed alcohol concentration, an oxygen sensor sensitive to an oxygen content of exhaust gases discharged from the engine for producing an air/fuel ratio feedback signal, a starter switch turned on when the engine is cranked, and a control unit coupled to the alcohol concentration sensor and the oxygen sensor for controlling the amount of fuel metered to the engine based upon engine operating conditions. The control unit includes first means for setting a first correction factor at a value calculated based upon the alcohol concentration signal to correct the amount of fuel metered to the engine, second means for setting a second correction factor based upon the air/fuel ratio feedback signal to correct the amount of fuel metered to the engine so as to provide an air/fuel ratio feedback control, third means responsive to failure in the alcohol concentration sensor for producing a failure signal, and fourth means operable in response to the failure signal. The fourth means includes means for modifying the first correction factor based upon the air/fuel ratio feedback signal to estimate a value of the first correction factor, and means for setting the first correction factor at the estimated value to correct the amount of fuel metered to the engine before a predetermined time is elapsed after the starter switch is turned on and at a predetermined value to correct the amount of fuel metered to the engine after the predetermined time is elapsed after the starter switch is turned on.

In another aspect of the invention, there is provided a fuel delivery control apparatus for use with an internal combustion engine operable on either of gasoline fuel and gasoline/alcohol fuel blend. The fuel delivery control apparatus comprises an alcohol concentration sensor sensitive to an alcohol concentration of the fuel to be delivered to the engine for producing an alcohol concentration signal indicative of a sensed alcohol concentration, an oxygen sensor sensitive to an oxygen content of exhaust gases discharged from the engine for producing an air/fuel ratio feedback signal, and a control unit coupled to the alcohol concentration sensor and the oxygen sensor for controlling the amount of fuel metered to the engine based upon engine operating conditions. The control unit includes first means for setting a first correction factor at a value calculated based upon the alcohol concentration signal to correct the amount of fuel metered to the engine, second means for setting a second correction factor based upon the air/fuel ratio feedback signal to correct the amount of fuel metered to the engine so as to provide an air/fuel ratio feedback control, third means responsive to failure in the alcohol concentration sensor for producing a failure signal, and fourth means operable in response to the failure signal. The fourth means includes means for detecting the air/fuel ratio feedback signal clamped in a first state representing a rich air/fuel mixture to produce a rich signal, means for detecting the air/fuel ratio feedback signal clamped in a second state representing a lean air/fuel mixture to produce a lean signal, means for comparing the calculated value of the first correction factor with a predetermined value, means responsive to the rich signal for setting the first correction factor at the calculated value to correct the amount of fuel metered to the engine when the calculated value of the first correction factor is less than the predetermined value and at the predetermined value when the calculated value of the first correction factor exceeds the predetermined value, and means responsive to the lean signal for setting the first correction factor at the calculated value to correct the amount of fuel metered to the engine when the calculated value of the first correction factor exceeds the predetermine value and at the predetermined time when the calculated value of the first correction factor is less than the predetermined value.

In still another aspect of the invention, there is provided a fuel delivery control apparatus for use with an internal combustion engine operable on either of gasoline fuel and gasoline/alcohol fuel blend. The fuel delivery control apparatus comprises an alcohol concentration sensor sensitive to an alcohol concentration of the fuel to be delivered to the engine for producing an alcohol concentration signal indicative of a sensed alcohol concentration, an oxygen sensor sensitive to an oxygen content of exhaust gases discharged from the engine for producing an air/fuel ratio feedback signal, and a control unit coupled to the alcohol concentration sensor and the oxygen sensor for controlling the amount of fuel metered to the engine based upon engine operating conditions. The control unit includes first means for setting a first correction factor at a value calculated based upon the alcohol concentration signal to correct the amount of fuel metered to the engine, second means for setting a second correction factor based upon the air/fuel ratio feedback signal to correct the amount of fuel metered to the engine so as to provide an air/fuel ratio feedback control, third means for setting a third correction factor based upon engine operating conditions to correct the amount of fuel metered to the engine so as to provide a fuel enrichment control, fourth means responsive to failure in the alcohol concentration sensor for producing a failure signal, and fifth means operable in response to the failure signal. The fifth means includes means for clamping the first correction factor at a first predetermined value to clamp the air/fuel ratio feedback signal in one of a first state representing a rich air/fuel mixture and a second state representing a lean air/fuel mixture, and means for interrupting the fuel enrichment control when the air/fuel ratio feedback signal clamped in the first state.

In another aspect of the invention, there is provided a fuel delivery control apparatus for use with an internal combustion engine operable on either of gasoline fuel and gasoline/alcohol fuel blend. The fuel delivery control apparatus comprises an alcohol concentration sensor sensitive to an alcohol concentration of the fuel to be delivered to the engine for producing an alcohol concentration signal indicative of a sensed alcohol concentration, an oxygen sensor sensitive to an oxygen content of exhaust gases discharged from the engine for producing an air/fuel ratio feedback signal, and a control unit coupled to the alcohol concentration sensor and the oxygen sensor for controlling the amount of fuel metered to the engine based upon engine operating conditions. The control unit includes first means for setting a first correction factor at a value calculated based upon the alcohol concentration signal to correct the amount of fuel metered to the engine, second means for setting a second correction factor based upon the air/fuel ratio feedback signal to correct the amount of fuel metered to the engine so as to provide an air/fuel ratio feedback control, third means for setting a third correction factor based upon engine operating conditions to correct the amount of fuel metered to the engine so as to provide a fuel enrichment control, fourth means responsive to failure in the alcohol concentration sensor for producing a failure signal, and fifth means operable in response to the failure signal. The fifth means includes means for setting the first correction factor at a first predetermined value while clamping the second correction factor at a second predetermined value to clamp the air/fuel ratio feedback signal in one of a first state representing a rich air/fuel mixture and a second state representing a lean air/fuel mixture, means for interrupting the fuel enrichment control when the air/fuel ratio feedback signal clamped in the first state, means for decreasing the first correction factor when the air/fuel ratio feedback signal is clamped in the first state and increasing the first correction factor when the air/fuel ratio feedback signal is clamped in the second state, and means for setting the first correction factor at an estimated value obtained when the air/fuel ratio feedback signal changes between the first and second states.

In another aspect of the invention, there is provided a fuel delivery control apparatus for use with an internal combustion engine operable on either of gasoline fuel and gasoline/alcohol fuel blend. The fuel delivery control apparatus comprises an alcohol concentration sensor sensitive to an alcohol concentration of the fuel to be delivered to the engine for producing an alcohol concentration signal indicative of a sensed alcohol concentration, an oxygen sensor sensitive to an oxygen content of exhaust gases discharged from the engine for producing an air/fuel ratio feedback signal, and a control unit coupled to the alcohol concentration sensor and the oxygen sensor for controlling the amount of fuel metered to the engine based upon engine operating conditions. The control unit includes first means for setting a first correction factor at a value calculated based upon the alcohol concentration signal to correct the amount of fuel metered to the engine, second means for setting a second correction factor based upon the air/fuel ratio feedback signal to correct the amount of fuel metered to the engine so as to provide an air/fuel ratio feedback control, third means for setting a third correction factor based upon engine operating conditions to correct the amount of fuel metered to the engine so as to provide a fuel enrichment control, fourth means responsive to failure in the alcohol concentration sensor for producing a failure signal, and fifth means operable in response to the failure signal. The fifth means includes means for setting the second correction factor at a second predetermined value while clamping the first correction factor at a first predetermined value to clamp the air/fuel ratio feedback signal in one of a first state representing a rich air/fuel mixture and a second state representing a lean air/fuel mixture, means for interrupting the fuel enrichment control when the air/fuel ratio feedback signal clamped in the first state, means for decreasing the second correction factor when the air/fuel ratio feedback signal is clamped in the first state and increasing the second correction factor when the air/fuel ratio feedback signal is clamped in the second state, means for detecting a value of the second correction factor when the air/fuel ratio feedback signal changes between the first and second states, means for calculating a difference _ALPHA of the detected value of the second correction factor from the second predetermined value of the second correction factor, and means for setting the estimated value of the first correction factor at a value ALCNEW calculated as ALCNEW=ALCOLD+ALCOLD×_ALPHA where ALCOLD is the first predetermined value of the first correction factor.

BRIEF DESCRIPTION OF THE DRAWINGS

The invention will be described in greater detail by reference to the following description taken in connection with the accompanying drawings, in which:

FIGS. 8 to 9 are flow diagrams illustrating the programming of the digital computer used in a second embodiment of the fuel delivery control apparatus of the invention;

DETAILED DESCRIPTION OF THE INVENTION

Figure 1:
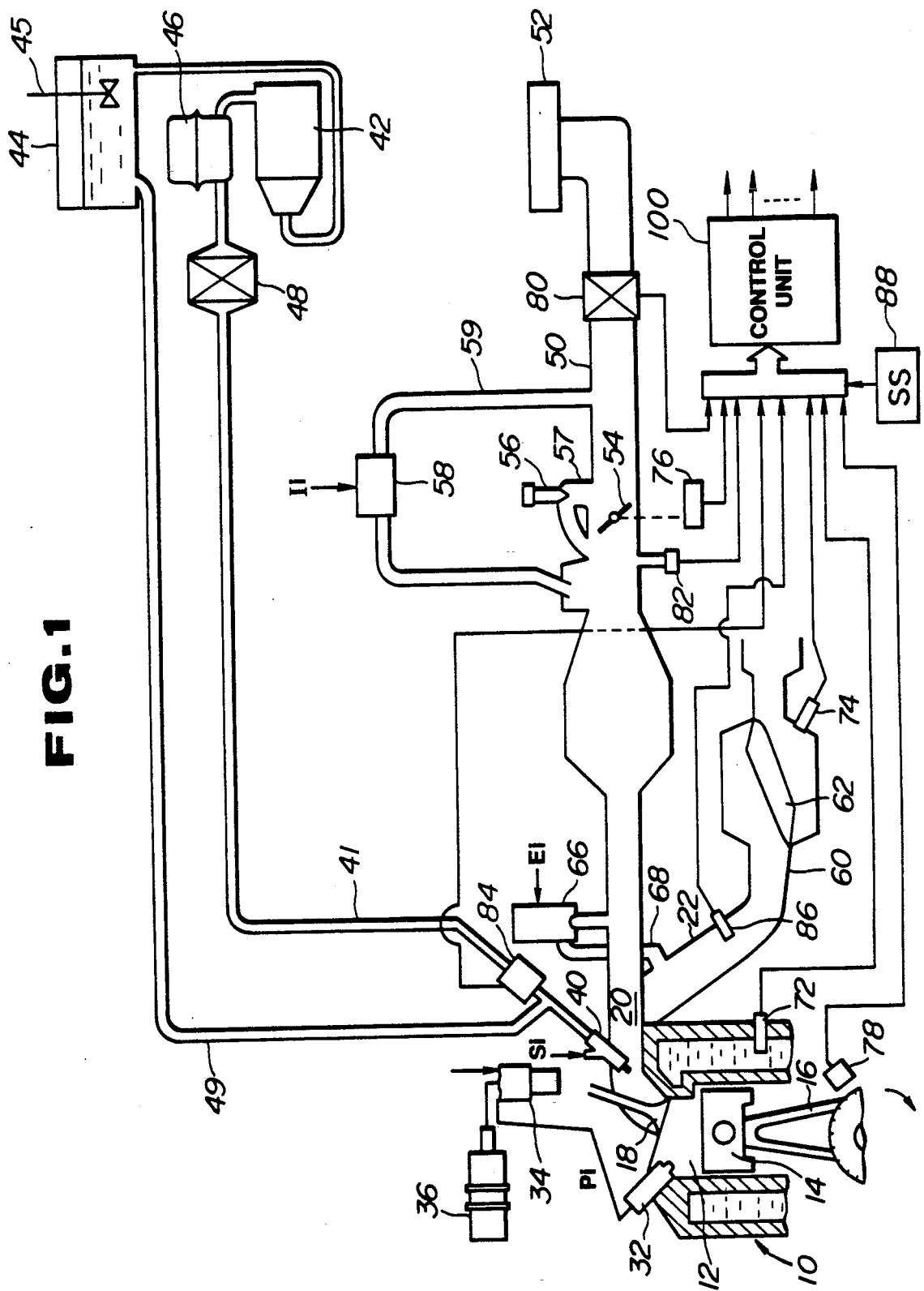
FIG. 1 is a schematic diagram of an internal combustion engine to which the invention is applicable.

With reference to the drawings, and in particular to FIG. 1, there is shown a schematic diagram of a fuel delivery control apparatus embodying the invention. An internal combustion engine, generally designated by the numeral 10, for an automotive vehicle includes a combustion chamber or cylinder 12. A piston 14 is mounted for reciprocal motion within the cylinder 12. A crankshaft 16 is supported for rotation within the engine 10 in response to reciprocation of the piston 14 within the cylinder 12.

An intake manifold 20 is connected with the cylinder 12 through an intake port with which an intake valve 18 is in cooperation for regulating the entry of combustion ingredients into the cylinder 12 from the intake manifold 20. A spark plug 32 is mounted in the top of the cylinder 12 for igniting the combustion ingredients within the cylinder 12 when the spark plug 32 is energized by the presence of high voltage electrical energy from a distributor 34 connected to an ignition coil 36. An exhaust manifold 22 is connected with the cylinder 12 through an exhaust port with which an exhaust valve (not shown) is in cooperation for regulating the exit of combustion products, exhaust gases, from the cylinder 12 into the exhaust manifold 22. The intake and exhaust valves are driven through a suitable linkage with the crankshaft.

A fuel injector 40 is mounted for injecting fuel into the intake manifold 20 toward the intake valve 18. The fuel injector 40 is connected by a conduit 41 to a fuel pump 42 which is also connected to a fuel tank 44. The fuel pump 42 is electrically operated to maintain sufficient pressure. The fuel tank 44 contains a gasoline fuel or a gasoline-alcohol fuel blend. The alcohol fuel may include methanol, ethanol, or methanol/ethanol blend. A device 45 is provided for stirring the gasoline-alcohol fuel blend to achieve a constant alcohol concentration in the fuel tank 44. A fuel pressure regulator 46 is connected to the fuel pump 42 and through a fuel filter 48 to the fuel injector 40. The pressure regulator 46 maintains the pressure differential across the fuel injector 40 at a constant level. This regulation is accomplished by a variation in the amount of excess fuel returned through a return conduit 49 to the fuel tank 44. The fuel injector 40 opens to inject fuel into the intake manifold 12 when it is energized by the presence of electrical signal Si. The length of the electrical pulse, that is, the pulsewidth, applied to the fuel injector 40 determines the length of time the fuel injector opens and, thus, determines the amount of fuel injected into the intake manifold 20.

Air to the engine 10 is supplied through an air cleaner 52 into an induction passage 50. The amount of air permitted to enter the combustion chamber through the intake manifold 20 is controlled by a butterfly throttle valve 54 located within the induction passage 50. The throttle valve 54 is connected by a mechanical linkage to an accelerator pedal (not shown). The degree to which the accelerator pedal is depressed controls the degree of rotation of the throttle valve 54. The accelator pedal is manually controlled by the operator of the engine control system. An idle adjustment screw 56 is provided to control the amount of air introduced into the induction passage 50 through a passage 57 bypassing the throttle valve 54 when the engine is idling. Similarly, a control valve 58 is provided to control the amount of air introduced into the induction passage 50 through a passage 59 bypassing the throttle valve 54. Preferably, the control valve 58 responds to a control pulse signal Sc by opening the bypass 59 according to the duty ratio of the control pulse signal.

In the operation of the engine 10, fuel is injected through the fuel injector 40 into the intake manifold 20 and mixes with the air therein. The engine is of the conventional four-cycle type. When the intake valve opens, the air-fuel mixture enters the combustion chamber 12. An upward stroke of the piston 14 compresses the air-fuel mixture, which is then ignited by a spark produced by the spark plug 32 in the combustion chamber 12. Combustion of the air-fuel mixture in the combustion chamber 12 takes place, releasing heat energy, which is converted into mechanical energy upon the power stroke of the piston 14. At or near the end of the power stroke, the exhaust valve opens and the exhaust gases are discharged into the exhaust manifold 22. Most of the exhaust gases are discharged to the atmosphere through an exhaust system which conventionally includes an exhaust passage, a catalytic converter, a muffler and an exhaust pipe. Some of the exhaust gases, however, are recirculated to the combustion chamber 12 through an exhaust gas recirculation (EGR) system. The EGR system includes a valve 66 provided in an EGR passage 68. The valve 66 is controlled to determine the amount of exhaust gases recirculated through the EGR passage 68 to the combustion chamber 12.

Although the engine 10 as illustrated in FIG. 1 shows only one combustion chamber 12 formed by a cylinder and piston, it should be understood that the engine control apparatus described herein is designed for use on a multi-cylinder engine. Thus, it should be understood that the number of the intake valves, exhaust valves, reciprocating pistons, spark plugs and fuel injectors are the same as the number of the cylinders. Only one throttle valve 54, one cold start valve 41, and one ignition coil 36 are required for multi-cylinder applications.

The amount of fuel metered to the engine, this being determined by the width of the electrical pulses Si applied to the fuel injector 40, the fuel-injection timing, and the ingition-system spark timing are repetitively determined from calculations performed by a digital computer, these calculations being based upon various conditions of the engine that are sensed during its operation. These sensed conditions include cylinder-head coolant temperature, catalytic converter temperature, exhaust oxygen content, throttle valve position, engine speed, intake air flow, engine intake-manifold absolute-pressure, and alcohol concentration. Thus, a cylinder-head coolant temperature sensor 72, a catalytic converter temperature sensor 74, a throttle position sensor 76, a crankshaft position sensor 78, a flow meter 80, an intake-manifold absolute-pressure sensor 82, an alcohol concentration sensor 84, and an oxygen sensor 86 are connected to a control unit 100. A starter switch 88 is also connected to the control unit 100.

The cylinder-head coolant temperature sensor 72 is mounted in the engine cooling system and comprises a thermistor connected to an electrical circuit capable of producing a coolant temperature signal in the form of a DC voltage having a variable level proportional to coolant temperature. The catalytic converter temperature sensor 74 senses a catalytic converter temperature and produces a catalytic converter temperature signal in the form of a DC voltage proportional to a sensed catalytic converter temperature. The throttle position sensor 76 is a potentiometer electrically connected to a voltage divider circuit for producing a throttle position signal in the form of a DC voltage proportional to throttle valve position. The crankshaft position sensor 78 is provided for producing a series of crankshaft position electrical pulses, each corresponding to two degrees of rotation of the engine crankshaft, of a repetitive rate directly proportional to engine speed and a predetermined number of degrees before the top dead center position of each engine piston. The flow meter 80 is responsive to the air flow through the induction passage 50 and it produces an intake airflow signal proportional thereto. The intake-manifold absolute-pressure sensor 82 preferably is a strain-gauge diaphragm-type absolute pressure transducer located in a position in the intake manifold therein there is minimum exposure to transient pressure conditions. The intake-manifold absolute-pressure sensor 82 produces an intake-manifold absolute-pressure signal indicative of a sensed intake-manifold absolute-pressure.

Figure 2:
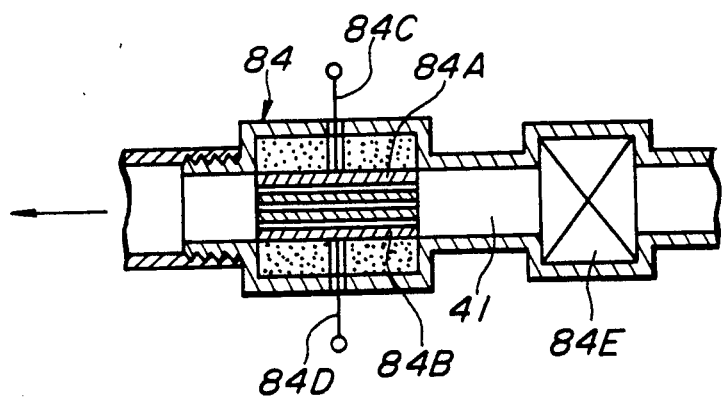
FIG. 2 is a sectional view of an alcohol concentration sensor used in the fuel delivery control apparatus of the invention.

The alcohol concentration sensor 84 is located at a position suitable to sense an alcohol concentration contained in the fuel delivered to the fuel injector 40 and it produces an alcohol concentration signal indicative of a sensed alcohol concentration. The alcohol concentration sensor 84 may comprises a capacitive probe comprised of a pair of U-shaped metal plates 84A and 84B arrange in spaced-parallel relation to each other, as shown in FIG. 2. The capacitive probe is inserted in the conduit 41 connected to the fuel injector 40. The capacitive prove has a capacitance variable in dependence on the alcohol concentration of the fuel delivered to the fuel injector 40. The capacitive probe has terminals 84C and 84D connected to the respective metal plates 84A and 84B. The terminals 84C and 84D are connected to a circuit for producing a signal proportional to the probe capacitance. In FIG. 2, the numeral 84E designates a filter provided in the conduit 41 somewhere upstream of the capacitive probe.

The oxygen sensor 86 monitors the oxygen content of the exhaust and it is effective to provide an air/fuel ratio feedback signal that shifts abruptly between a high voltage representing a rich mixture relative to the stoichiometric value and a low value representing a lean mixture relative to the stoichiometric value. Consequently, the air/fuel ratio feedback signal is useful to indicate only the sense of deviation of the air/fuel ratio relative to the stoichiometric value. The output of the oxygen sensor 86 is provided to a comparator switch whose output is high or low value representing the sense of deviation of the air/fuel ratio of the mixture supplied to the engine from the stoichiometric value. The output of the comparator switch is coupled to a circuit which provides an air/fuel ratio control signal which varies at a constant rate in one direction when the air/fuel ratio is leaner than the stoichiometric value and changes at a constant rate in the opposite direction when the air/fuel ratio is greater than the stichiometric value. The control signal will oscillate about the stoichiometric air/fuel ratio as sensed by the oxygen sensor 86 thereby producing an average stoichiometric air/fuel ratio of the mixture supplied to the engine.

The starter switch 88 produces an engine cranking condition signal indicative of the fact that the engine is being cranked.

Figure 3:
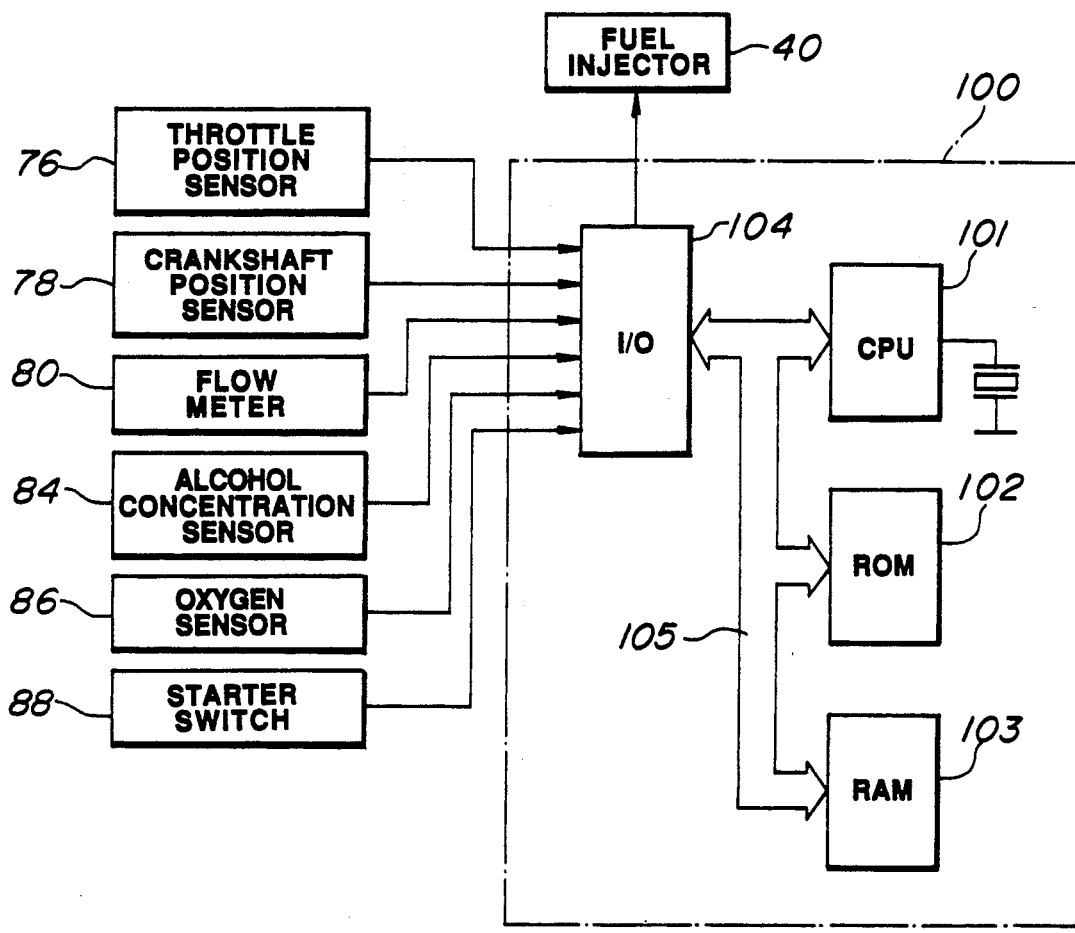
FIG. 3 is a schematic block diagram of the control unit used in the fuel delivery control apparatus of the invention.

Referring to FIG. 3, the control unit 100 comprises a digital computer which includes a central processing unit (CPU) 101, a read only memory (ROM) 102, a random access memory (RAM) 103, and an input/output control unit (I/O) 104. The central processing unit 101 communicates with the rest of the computer via data bus 105. The input/output control unit 104 includes an analog-to-digital converter which receives analog signals from the flow meter and other sensors and converts them into digital form for application to the central processing unit 101 which selects the input channel to be converted. The read only memory 102 contains programs for operating the central processing unit 101 and further contains appropriate data in look-up tables used in calculating appropriate values for fuel delivery requirement. The central processing unit 101 is programmed in a known manner to interpolate between the data at different entry points.

The central processing unit 101 calculates the fuel delivery requrement in the form of fuel-injection pulse-width. For this purpose, a basic value Tp for fuel-injection pulse-width is calculated as $$Tp = k \times Q/N$$

where k is a constant, Q is the intake air flow and N is the engine speed. The calculated fuel-injection pulse-width basic value Tp is then corrected for various engine operating parameters. The corrected fuel-injection pulse-width value Ti is given as $$Ti = Tp \times COEF \times ALPHA \times ALK \times KBLRC + Ts$$

where ALPHA is a correction factor related to the oxygen content of the exhaust gases for providing a closed loop air/fuel ratio control, ALC is a correction factor related to the alcohol concentration contained in the fuel delivered to the fuel injector 40, and Ts is correction factor related to the voltage of the car battery. The central processing unit 101 samples the closed loop air/fuel ratio control signal once for each of sampling events for calculating an average value representing the existing air/fuel ratio. The central processing unit 101 calculates a difference ΔALPHA of the calculated average value relative to the stoichiometric value and stores the calculated difference into the computer memory. During steady engine operating conditions, the central processing unit 101 has a learning control function of relating the calculated difference ΔALPHA to existing engine operating conditions, for example, engine load and engine speed. The central processing unit 101 utilizes the stored difference ΔALPHA to calculate the correction factor KBLRC which is used to further adjust the calculated injection interval in a direction to correct the sensed air/fuel ratio error. The correction factor COEF is given as $$COEF = 1 + (KMR + KTRM) + KTW + KAS + KAI + KACC$$

where KMR is a correction factor for providing fuel enrichment control under high engine load conditions. The correction factor KMR is greater at a hevier engine load or at a higher engine speed. KTRM is a correction factor for providing fuel leaning control under light engine load conditions. KTW is a correction factor decreasing as the engine coolant temperature increases, KAS is a correction factor for providing fuel enrichment control when the engine is cranking, KAI is a correction factor for providing a fuel enrichment control when the engine is idling, and KACC is a correction factor set at a negative value when the throttle position exceeds a predetermined angle and then it increases toward zero as the engine speed increases.

Control words specifying desired fuel delivery requirements are periodically transferred by the central processing unit 101 to the fuel-injection circuit included in the input/output control circuit 104. The fuel injection control circuit converts the received control word into a fuel injection pulse signal Si for application to a power transistor which connects the fuel injector 40 to the car battery for a time period calculated by the digital computer.

Figure 4:
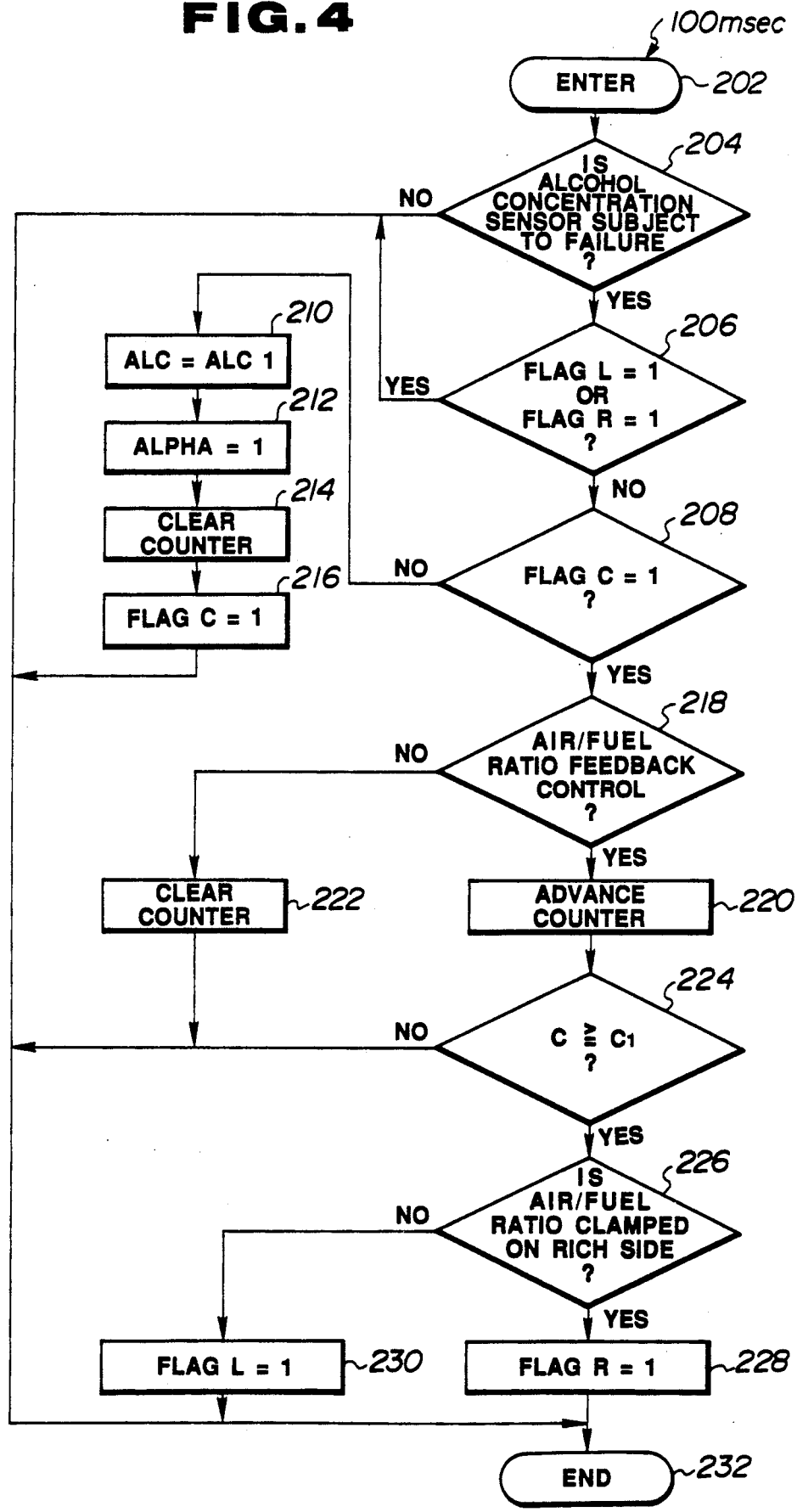
FIGS. 4 and 5 are flow diagrams illustrating the programming of the digital computer used in a first embodiment of the fuel delivery control apparatus of the invention.

FIG. 4 is a flow diagrams illustrating the programming of the digital computer as it is used to set a flag L or R used in estimating the alcohol concentration related correction factor ALC in the event of failure of the alcohol concentration sensor 84 or its associated circuit.

The computer program is entered at the point 202 at uniform intervals of time, for example, 100 msec. At the point 204 in the program, a determination is made as to whether or not the alcohol concentration sensor 84 or its associated circuit is subject to failure. For this determination, the digital computer 100 may be programmed to detect a failure in the alcohol concentration sensor 84 or its associated circuit when the time period during which the actual air/fuel ratio sensed by means of the oxygen senser 86 is held clamped on the lean or rich side with respect to the stoichiometric value exceeds a predetermined time, or when the actual air/fuel ratio is on the lean side with respect to that to the stoichiometric value in spite of the fact that the engine is controlled to operate at an air/fuel ratio richer than the stoichiometric value, or when the alcohol concentration signal has a voltage value out of a predetermined acceptable range, or when the rate of change of the voltage value of the alcohol concentration signal is greater than a predetermined value. If the answer to this question is "yes", then the program proceeds to the point 206. Otherwise, the program proceeds to the end point 232.

At the point 206 in the program, a determination is made as to whether or not the flag L or R has been set. If the answer this question is "yes", then the program proceeds to the end point 232. Otherwise, the program proceeds to another determination step at the point 208. This determination is as to whether or not a flag C has been set. It the answer to this question is "yes", then the program proceeds to the point 218. Otherwise, the program proceeds to the point 210.

At the point 210 in the program, the correction factor ALC is set at a predetermined value ALC1, for example, 1.547 suitable for a gasoline/alcohol fuel blend containing 50% alcohol concentration. This concentration factor ALC1 (1.547) will provide a richest possible mixture for the gasoline fuel containing 0% alcohol concentration and a leanest possible mixture for the gasoline/alcohol fuel blend containing 85% alcohol concentration. It is to be noted that the correction factor ALC may be set at a predetermined value suitable for a gasoline/alcohol fuel blend containing an alcohol concentration ranging from 40% to 50%.

At the point 212 in the program, the correction factor ALPHA is clamped at 1. At the point 214 in the program, a counter is cleared to its initial value. At the point 216 in the program, the flag C is set to indicate that the correction factor ALC has been clamped at the predetermined value ALC1 and the correction faction ALPHA has been clamped at 1. Following this the program proceeds to the end point 232.

At the point 218 in the program, a determination is made as to whether or not the engine is operating with a closed loop air/fuel ratio control. If the answer to this question is "yes", then the program proceeds to the point 220 where the counter is advanced and then to the point 224. Otherwise, the program proceeds to the point 222 where the counter is cleared to its initial value and then to the end point 232.

At the point 224 in the program, a determination is made as to whether or not the count C of the counter exceeds a predetermined value C1. If the answer to this question is "yes", then it means that a predetermined time, for example, 5 seconds, which is sufficient for the actual air/fuel ratio to be clamped on the lean or rich side with respect to its stoichiometric value after the correction factor ALC was clamped at the predetermined value ALC1 and the correction factor ALPHA was set at 1, has been elaped and the program proceeds to the point 226. Otherwise, the program proceeds to the end point 232.

At the point 226 in the program, a determination is made as to whether or not the air/fuel ratio is clamped on the rich side. If the answer to this question is "yes", then the program proceeds to the point 228 where the flag R is set to indicate that the air/fuel ratio has been clamped on the rich side with respect to the stoichiometric value and then to the end point 232. Otherwise, the program proceeds to the point 230 where the flag L is set to indicate that the air-fuel ratio has been clamped on the lean side with respect to the stoichiometric value and then to the end point 232.

Figure 5:
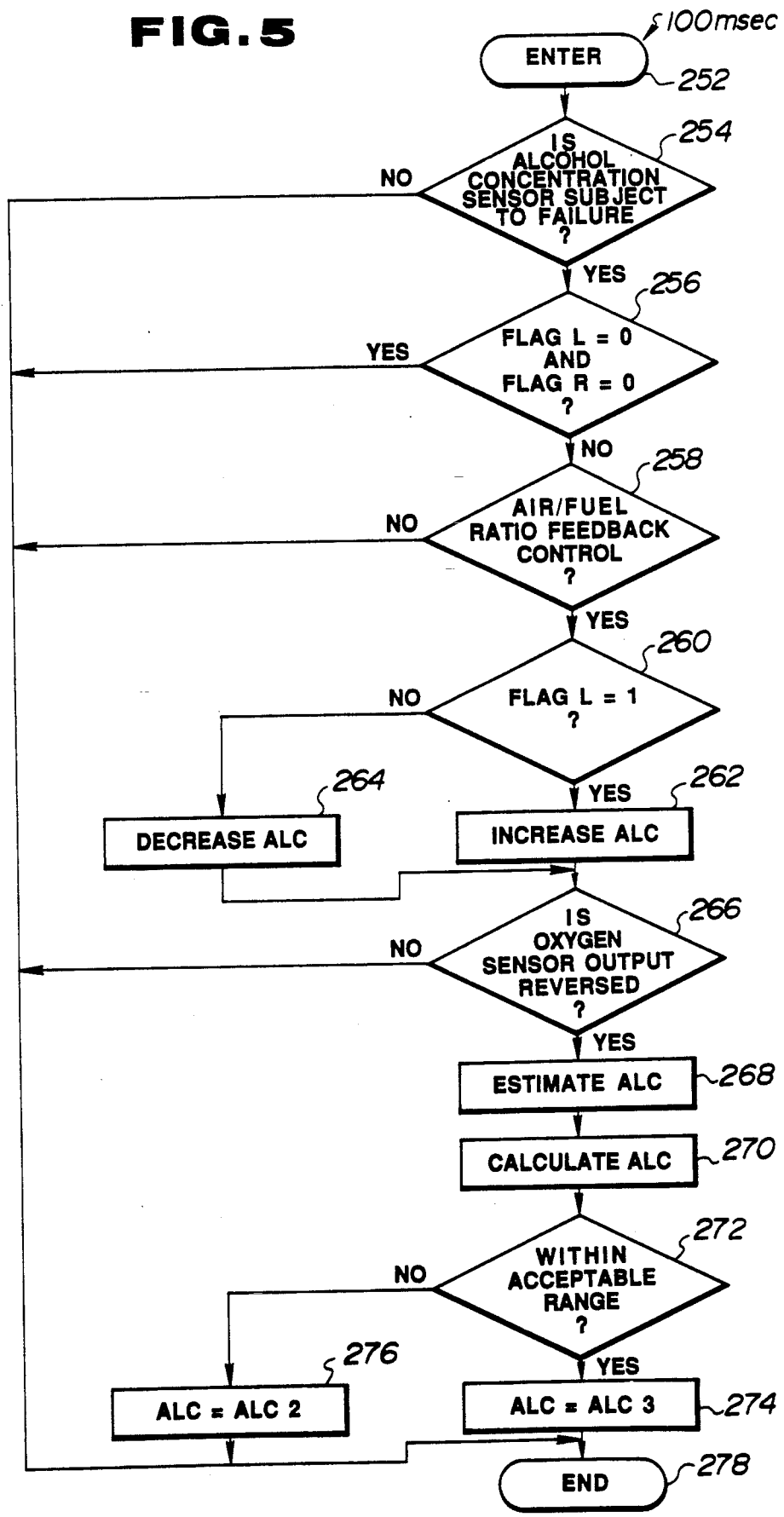

FIG. 5 is a flow diagram illustrating the programming of the digital computer as it is used to calculate the alcohol concentration related correction factor ALC in the event of failure of the alcohol concentration sensor or its associated circuit.

The computer program is entered at the point 252 at uniform intervals of time, for example, 100 msec. At the point 254 in the program, a determination is made as to whether or not the alcohol concentration sensor 84 or its associated circuit is subject to failure. This determination is made in such a manner as described in connection with the point 204 of the flow diagram of FIG. 4. If the answer to this question is "yes", then the program proceeds to the point 256. Otherwise, the program proceeds to the end point 278.

At the point 256 in the program, a determination is made as to whether or not both of the flags L and R are cleared. If the answer to this question is "yes", then the program proceeds to the end point 278. Otherwise, the program proceeds to another determination step at the point 258. This determination is as to whether or not the engine is operating with a closed loop air/fuel ratio control. If the answer to this question is "yes", then the program proceeds to the point 260. Otherwise, the program proceeds to the end point 278.

At the point 260 in the program, a determination is made as to whether or not the flag L has been set. The flag L is set, at the point 230 of the flow diagram of FIG. 4, to indicate that the actual air/fuel ratio has been clamped on the lean side with respect to the stoichiometric value. If the answer to this question is "yes", then the program proceeds to the point 262 where the correction factor ALC is increased to enrich the air/fuel ratio by adding a predetermined value to the last value (initially equal to ALC1 set at the point 208 of the flow diagram of FIG. 4) of the correction factor ALC and then to the point 266. Otherwise, it means that the flag R has been set at the point 228 of the flow diagram of FIG. 4 and the program proceeds to the point 264 where the correction factor ALC is decreased to lean out the air/fuel ratio by substracting the predetermined value from the last value (initially equal to ALC1 set at the point 208 of the flow diagram of FIG. 4) of the correction factor ALC and then to the point 266.

At the point 266 in the program, a determination is made as to whether or not the oxygen sensor output reverses or changes between its high and low levels. If the answer to this question is "yes", then it means the arrival of the correction factor ALC at a value ALC2 used as an estimated correction factor value and the program proceeds to the point 268. Otherwise, the program sequence from the point 260 to the point 266 is repeated with the correction factor ALC being increased or decreased by the predetermined value in each cycle of execution of the repeated program sequence until the oxygen sensor output reverses or changes between the low and high level.

At the point 268 in the program, the central processing unit estimates the correction factor ALC as the value ALC obtained when the oxygen sensor output reverses. The estimated alcohol concentration related correction factor value ALC2 is soted into the computer memory. At the point 270 in the program, the central processing unit calculates a value ALC3 based on the existing value of the signal fed thereto from the alcohol concentration sensor 84. The calculated alcohol concentration related correction factor value ALC3 is stored into the computer memory. At the point 272 in the program, a determination is made as to whether or not the difference between the estimated and calculated values ALC2 and ALC3 is equal to or less than a predetermined value A. If the answer to this question is "yes", then it means that the alcohol concentration sensor 84 and its associated circuit are in order and the program proceeds to the point 274 where the correction factor ALC is set at the calculated value ALC3 and then to the end point 278. Otherwise, it means that the alcohol concentration sensor 84 or its associated circuit is out of order and the program proceeds to the point 276 where the correction factor ALC is set at the estimated value ALC2 and then to the end point 278.

In the event of failure of the alcohol concentration sensor or its associated circuit, the correction factor ALC is increased or decreased at time intervals with the correction factor ALPHA being clamped at 1 until the oxygen sensor output reverses. The correction factor ALC is estimated as a value ALC2 existing when the oxygen sensor output reverses. The correction factor ALC is calculated based on the existing value of the alcohol concentration sensor output. If the difference between the estimated and calculated values ALC2 and ALC3 of the correction factor ALC is within an acceptable range, it may be considered that the alcohol concentration sensor and its associated circuit are in order and the correction factor ALC is set at the calculated value ALC3. If the difference is out of the acceptable range, it may be considered that the alcohol concentration sensor or its associated circuit is not in order and the correction factor ALC is set at the estimated value ALC2.

According to this embodiment, the correction factor ALC is set at an estimated value ALC2 to provide good air/fuel ratio control in the event of failure of the alcohol concentation sensor or its associated circuit. When the correction factor ALC has not been estimated, the correction factor ALC is set at a predetermined value ALC1, for example, 1.547 suitable for a gasoline/alcohol fuel blend containing 50% alcohol concentration. The predetermined value ALC1 provides a richest possible air/fuel mixture for the gasoline fuel containing 0% alcohol concentration and a leanest possible air/fuel mixture for the gasoline/alcohol fuel blend containing 85% alcohol concentration. It is, therefore, possible to start the engine even though the alcohol concentration changes after the vehicle is refueled.

The control unit 100 is arranged to check whether the alcohol concentration sensor 84 is restored to its normal condition. If the alcohol concentration sensor 84 is restored, the correction factor ALC is set at a value ALC2 calculated based upon the alcohol concentration sensor output. This is useful when the alcohol concentration sensor output changes temporarily to an abnormal condition due to noises introduced on the alcohol concentration sensor output or the like.

Although this embodiment has been described as estimating the correction factor ALC by changing the correction factor ALC from a predetermined value ALC1 with the correction factor ALPHA being clamped at 1, it is to be noted that the correction factor ALC may be estimated by changing the correction factor ALPHA with the correction factor ALC being clamped at the predetermined value ALC1, as described in connection with the flow diagrams of FIGS. 6 to 8.

A second embodiment of the fuel delivery control apparatus of the invention will be described with reference to FIGS. 6 to 9.

Figure 6:
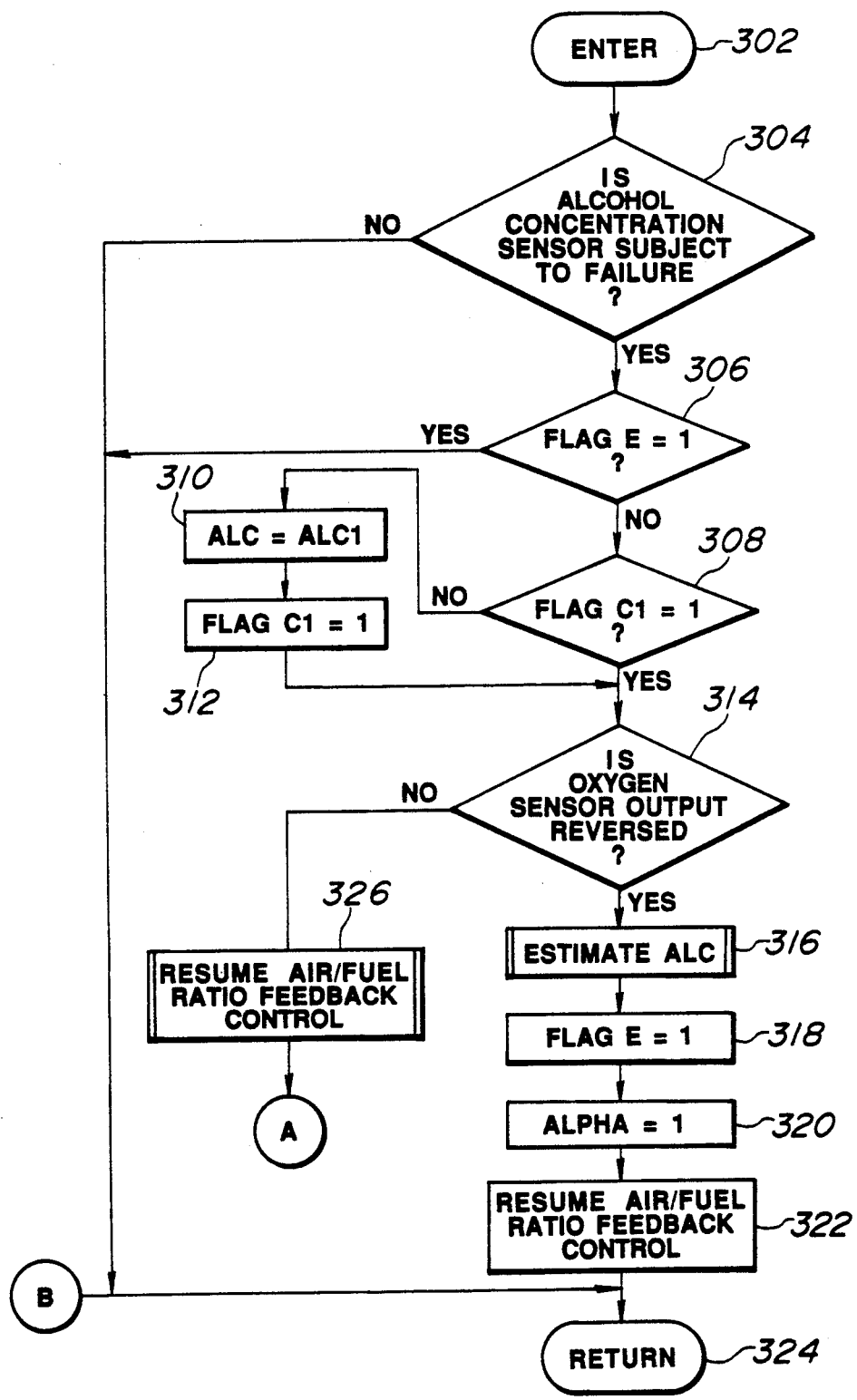
FIGS. 6 and 7 are flow diagrams illustrating the programming of the digital computer as it is used to estimate the alcohol concentration related correction factor ALC in the event of failure of the alcohol concentration sensor 84 or its associated circuit.
Figure 7:
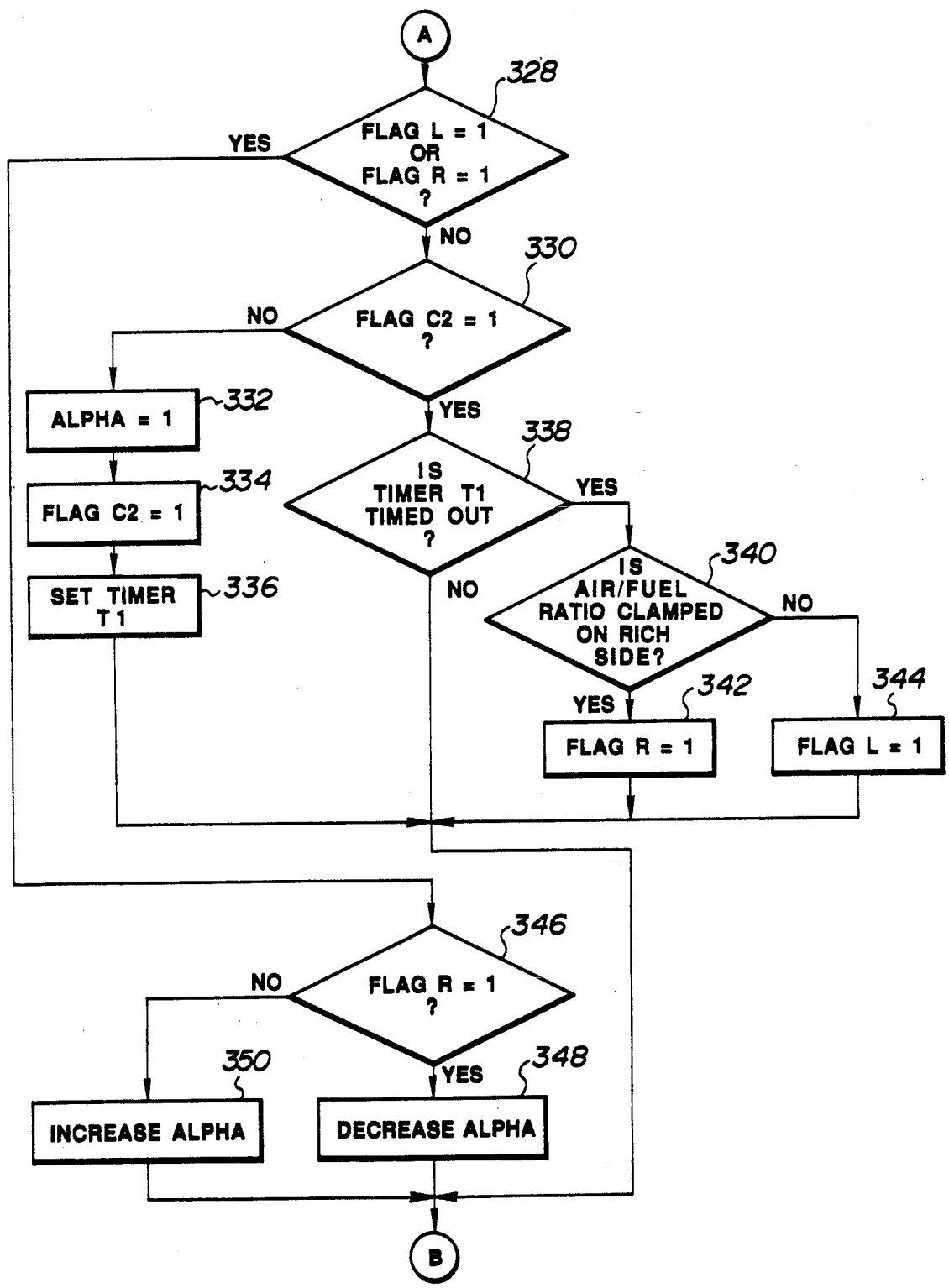

FIGS. 6 and 7 are flow diagrams illustrating the programming of the digital computer as it is used to estimate the alcohol concentration related correction factor ALC in the event of failure of the alcohol concentration sensor 84 or its associated circuit.

The computer program is entered at the point 302. At the point 304 in the program, a determination is made as to whether or not the alcohol concentration sensor 84 or its associated circuit is subject to failure. For this purpose, the digital computer may be programmed to detect a failure in the alcohol concentration sensor 84 or its associated circuit when the time period during which the actual air/fuel ratio sensed by means of the oxygen sensor 86 is held clamped on the lean or rich side with respect to the stoichiometric value exceeds a predetermined time, or when the actual air/fuel ratio is on the lean side with respect to the stoichiometric value in spite of the fact that the engine is controlled to operate at an air/fuel ratio richer than the atoichiometric value, or when the alcohol concentration signal has a voltage value out of a predetermined acceptable range, or when the rate of change of the voltage value of the alcohol concentration signal is greater than a predetermined value. If the answer to this question is "yes", then the program proceeds to the point 306. Otherwise, the program proceeds to the point 324 where the computer program is returned to the entry point 302.

At the point 306 in the program, a determination is made as to whether or not a flag E has been set. If the answer to this question is "yes", then it means that the correction factor ALC has been estimated and the program proceeds to the point 324. Otherwise, the program proceeds to another determination step at the point 308. This determination is as to whether or not a flag C1 has been set. If the answer to this question is "yes", then it means that the correction factor ALC has been clamped at a predetermined value ALC1, for example, 1.547 suitable for a gasoline/alcohol fuel blend containing 50% alcohol concentration and the program proceeds to the point 314. Otherwise, the program proceeds to the point where the correction factor ALC is clamped at the predetermined value ALC1 and then to the point 312 where the flag C1 is set to indicate that the correction factor ALC has been set at the predetermined value ALC1. Following this, the program proceeds to the point 314.

At the point 314 in the program, a determination is made as to whether or not the oxygen sensor output reverses or changes between its low and high levels. If the answer to this question is "yes", then it means that the conditions for estimation of the correction factor ALC is fulfilled and the program proceeds to the point 326 where the air/fuel ratio feedback control is resumed and then to the point 328 (FIG. 7).

At the point 316 in the program, the correction factor ALC is estimated. This estimation will be described in connection with the flow diagram of FIG. 8. At the point 318, the flag E is set to indicate that the correction factor ALC has been estimated. Following this, the program proceeds to the point 320 where the correction factor ALPHA is initiated to 1 and then to the point S28 where the closed loop air/fuel ratio feedback control is resume. After the closed loop air/fuel ratio feedback control is resumed, the program proceeds to the point 324 where the computer program is returned to the entry point 302.

At the point 328 (FIG. 7) in the program, a determination is made as to whether or not a flag L or R has been set. If the answer to this question is "yes", then the program proceeds to the point 346. Otherwise, the program proceeds to another determination step at the point 330. This determination is as to whether or not a flag C2 is set. If the answer to this question is "yes", then it means that the correction factor ALPHA has been set at 1 and the program proceeds to the point 338. Otherwise, the program proceeds to the point 332 where the correction factor ALPHA is set at 1 and then to the point 334 where the flag C2 is set to indicate that the correction factor ALPHA has been set at 1. At the point 336 in the program, a timer T1 is set at a predetermined time, for example, 5 seconds, sufficient for the air/fuel ratio to be clamped on the lean or rich side with respect to its stoichiometric value. Following this, the program proceeds to the point 324 (FIG. 6).

At the point 338 in the program, a determination is made as to whether or not the time T1 is timed out. If the answer to this question is "yes", then it means that the predetermined time set at the point 336 has been elapsed and the program proceeds to the point 340. Otherwise, the program proceeds to the point 324 (FIG. 6).

At the point 340 in the program, a determination is made as to whether or not the air/fuel ratio is clamped on the rich side. If the answer to this question is "yes", then the program proceeds to the point 342 where the flag R is set to indicate that the air/fuel ratio has been clamped on the rich side with respect to its stoichiometric value and then to the point 324 (FIG. 6). Otherwise, the program proceeds to the point 344 where the flag L is set to indicate that the air/fuel ratio has been clamped on the lean side with respect to its stoichiometric value and then to the point 324 (FIG. 6).

At the point 346 in the program, a determination is made as to whether or not the flag R has been set. If the answer to this question is "yes", then it means that the air/fuel ratio has been clamped on the rich side with respect to its stoichiometric value and the program proceeds to the point 348 where the correction factor ALPHA is decreased to lean out the air/fuel ratio by subtracting a predetermined value from the last value (initially equal to 1 set at the point 332) of the correction factor ALPHA and then to the point 324 (FIG. 6). Otherwise, it means that the air/fuel ratio has been clamped on the lean side with respect to its stoichiometric value and the program proceeds to the point 350 where the correction factor ALPHA is increased to enrich the air/fuel ratio by adding the predetermined value from the last value (initially equal to 1 set at the point 332) of the correction factor ALPHA and then to the point 324 (FIG. 6).

The program sequence from the point 326 to the point 350 is repeated with the correction factor ALPHA being increased or decreased by the predetermined value in each cycle of execution of the repeated program sequence until the oxygen sensor output reverses or changes between the low and high level at the point 314 of the flow diagram of FIG. 6.

Figure 8:
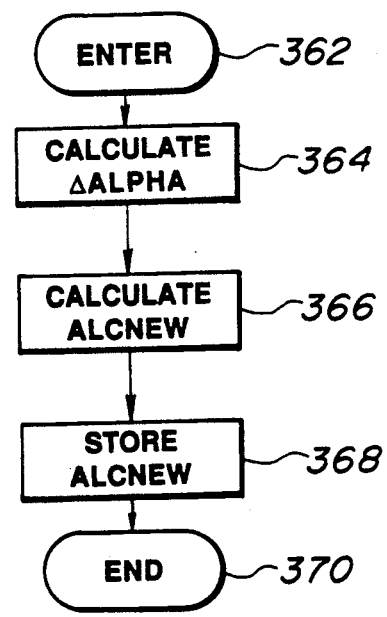

FIG. 8 is a flow diagram illustrating the programming of the digital computer as it is used to estimate the correction factor ALC in the event of failure of the alcohol concentration sensor or its associated circuit.

The computer program is entered at the point 362 which corresponds to the point 314 of the flow diagram of FIG. 6. At the point 364 in the program, the central processing unit calculates a difference ΔALPHA of the value ALPHA1 of the correction factor ALPHA obtained when the oxygen sensor output reverses (point 314) from the ALPHA2 (=1) of the correction factor ALC set at the point 332 of the flow diagram of FIG. 7.

At the point 366 in the program, the central processing unit calculates a new value ALCNEW for the correction factor ALC based on the calculated difference ΔALPHA and the last value ALCOLD of the correction factor ALC as $$ALCNEW = ALCOLD + ALCOLD \times \Delta ALPHA$$

At the point 368 in the program, the calculated new value ALCNEW (estimated value ALC2) is stored in the computer memory. Following this, the program proceeds to the end point 370 which corresponds to the point 318 of the flow diagram of FIG. 6.

FIG. 9 is a flow diagram illustrating the programming of the digital computer as it is used to calculate the alcohol concentration related correction factor ALC.

The computer program is entered at the point 382. At the point 384 in the program, a determination is made as to whether or not the starter switch 88 is turned on. If the answer to this question is "yes", then it means that the engine is cranked and the program proceeds to the point 400. Otherwise, the program proceeds to another determination step at the point 386. This determination is as to whether or not the alcohol concentration sensor 84 or its associated circuit is subject to failure. This determination is made in such a manner as described in connection with the point 304 of the flow diagram of FIG. 6. If the answer to this question is "yes", then the program proceeds to the point 388. Otherwise, the program proceeds to the point 416 where the computer program is returned to the entry point 382.

At the point 388 in the program, a determination is made as to whether or not a flag F has been set. If the answer to this question is "yes", then it means that the correction factor ALC has been changed from the estimated value ALC2 to the predetermined value ALC1 and the program proceeds to the point 416. Otherwise, the program proceeds to another determination step at the point 390. This determination is as to whether or not the engine is operating with a closed loop air/fuel ratio control. If the answer to this question is "yes", then the program proceeds to the point 416. Otherwise, the program proceeds to another determination step at the point 392. This determination is as to whether or not a timer T2 has been timed out. If the answer to this question is "yes", then it means that the fuel arriving at the fuel injector 40 may have a changed alcohol concentration when the vehicle has been refueled and the program proceeds to the point 394. Otherwise, the program proceeds to the point 416.

At the point 394 in the program, the central processing unit changes the estimated value ALC2 to bring it closer to the predetermined value ALC1 with the lapse of time. Following this, the program proceeds to the point 396 where a determination is made as to whether or not the correction factor ALC has been changed from the estimated value ALC2 to the predetermined value ALC1. If the answer to this question is "yes", then the program proceeds to the point 398 where the flag F is set to indicate that the correction factor has been changed to the predetermined value ALC1 and then to the point 416. Otherwise, the program proceeds directly to the point 416.

At the point 400 in the program, the flag F is cleared. At the point 402, the timer T2 is set at the predetermined time during which fuel travels from the fuel tank 44 to the fuel injector 40. At the point 404 in the program, a determination is made as to whether or not the alcohol concentration sensor 84 or its associated circuit is subject to failure. This determination is made in such a manner as described in connection with the point 304 of the flow diagram of FIG. 6. If the answer to this question is "yes", then the program proceeds to the point 408. Otherwise, it means that the alcohol concentration sensor 84 and its associated circuit are in order and the program proceeds to the point 406 where the correction factor ALC is calculated based on the alcohol concentration sensed by the alcohol concentration sensor 84 and then to the point 416.

At the point 408 in the program, a determination is made as to whether or not the flag E has been set. If the answer to this question is "yes", then it means that the correction factor ALC has been estimated at the point 316 of the flow diagram of FIG. 6 and the program proceeds to the point 410. Otherwise, the program proceeds to the point 412 where the correction factor ALC is set at the predetermined value ALK1 set at the point 310 of the flow diagram of FIG. 6 and then to the point 416.

At the point 410 in the program, a determination is made as to whether or not the timer T2 has been timed out. If the answer to this question is "yes", then the program proceeds to the point 412. Otherwise, the program proceeds to the point 414 where the correction factor ALC is set at the estimated value ALC2 obtained at the point 316 of the flow diagram of FIG. 6 and then to the point 416 where the computer program is returned to the entry point 382.

In the event of failure of the alcohol concentration sensor or its associated circuit, the correction factor ALPHA is increased or decreased at time intervals with the correction factor ALC being clamped at a predetermined value until the oxygen sensor output reverses. When the oxygen sensor output reverses, the correction factor ALC is estimated. The estimated value ALC2 of the correction factor ALC is used for a predetermined time after the engine is cranked. The predetermined time corresponds to the time required for fuel to travel from the fuel tank 44 to the fuel injector 40. When the predetermined time has been elapsed, the correction factor ALC is clamped to a predetermined value ALC1, for example, 1.547, suitable for a gasoline/alcohol fuel blend containing 50% alcohol concentration. The predetermined value ALC1 provides a richest possible air/fuel mixture for the gasoline fuel containing 0% alcohol concentration and a leanest possible air/fuel mixture for the gasoline/alcohol fuel blend containing 85% alcohol concentration. The reason for this is that the fuel arriving at the fuel injector 40 has a changed alcohol concentration when the vehicle is refueled. It is, therefore, possible to start the engine even though the alcohol concentration changes after the vehicle is refueled. When the predetermined time has been elapsed, the correction factor ALC is newly estimated. When the or when the correction factor ALC has not been estimated in the event of failure of the alcohol concentration sensor 84 or its associated circuit, it is set at the predetermined value ALC1.

Although this embodiment has been described as estimating the correction factor ALC by changing the correction factor ALPHA with the correction factor ALC being clamped at the predetermined value, it is to be noted that the correction factor ALC may be estimated by changing the correction factor ALC with the correction factor ALPHA being clamped at a predetermined value, for example, 1, as described in connection with the flow diagrams of FIGS. 4 and 5.

Figure 10:
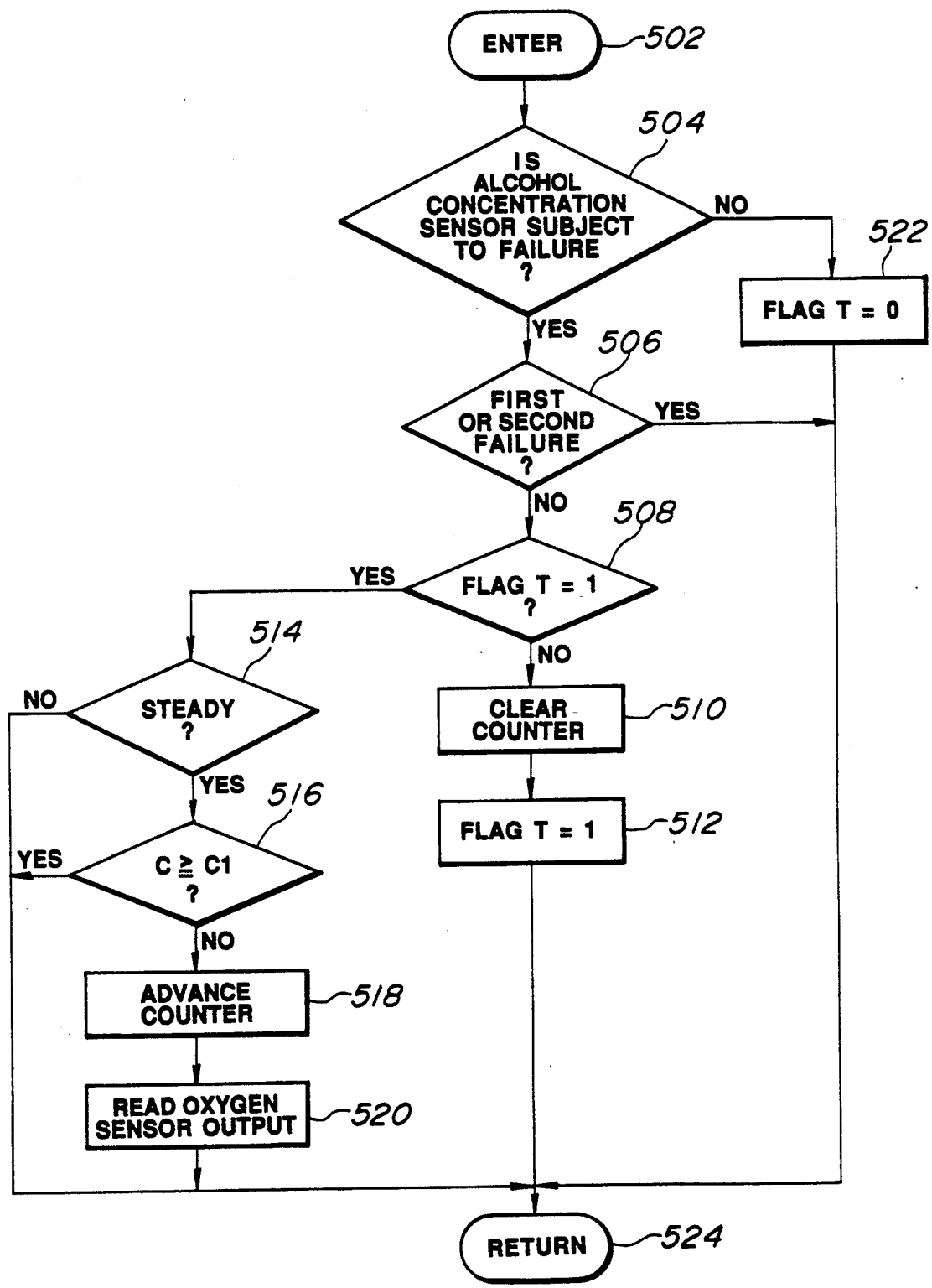
FIGS. 10 and 11 are flow diagrams illustrating the programming of the digital computer used in a third embodiment of the fuel delivery control apparatus of the invention.

A third embodiment of the fuel delivery control apparatus of the invention will be described in connection with FIGS. 10 and 11.

Figure 11:
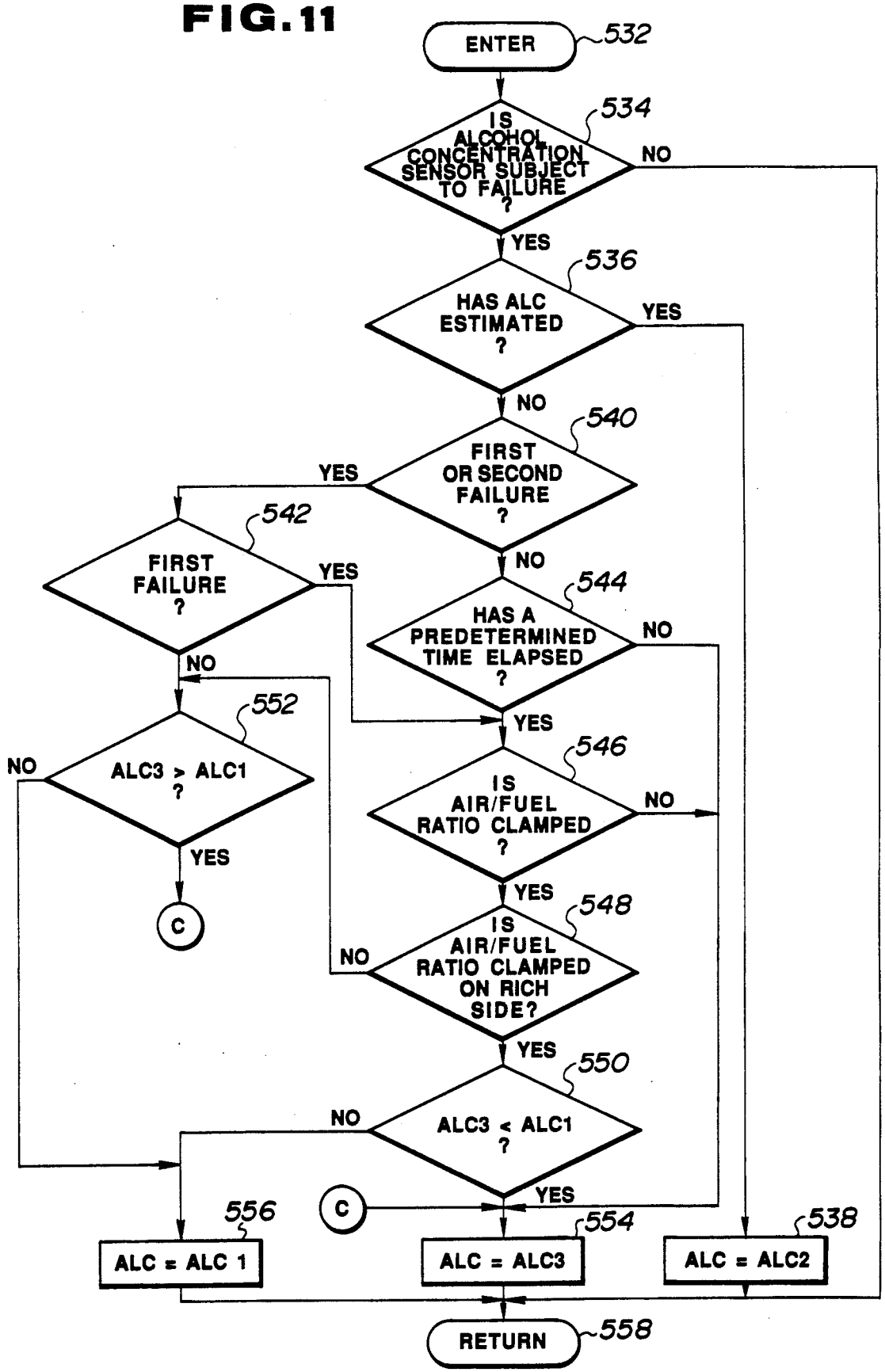

FIG. 11 is a flow diagram illustrating the program of the digital computer as it is used to determine the condition where the signal fed thereto from the oxygen sensor 86 is read into the computer memory.

The computer memory is entered at the point 502. At the point 504 in the program, a determination is made as to whether or not the alcohol concentration sensor 84 or its associated circuit is subject to failure. For this purpose, the digital computer may be programmed to detect a failure in the alcohol concentration sensor 84 or its associated components when one of the following conditions are fulfilled:

(1) The time period during which the actual air/fuel ratio sensed by means of the oxygen sensor 86 is held clamped on the lean or rich side with respect to the stoichiometric value exceeds a predetermined time. The failure detected when this condition is fulfilled will be referred to as a first failure.

(2) The actual air/fuel ratio is on the lean side with respect to the stoichiometric value in spite of the fact that the engine is controlled to operate at an air/fuel ratio richer than the stoichiometric value. The failure detected when this condition is fulfilled will be referred to as a second failure.

(3) The alcohol concentration signal has a voltage value out of a predetermined acceptable range.

If the answer to this question is "yes", then the program proceeds to the point 506. Otherwise, the program proceeds to the point 522 where a flag T is cleared and then to the point 524 where the computer program is returned to the entry point 502.

At the point 506 in the program, a determination is made as to whether or not the first or second failure occurs. If the answer to this question is "yes", then the program proceeds to the point 524. Otherwise, the program proceeds to another determination step at the point 508. This determination is as to whether or not the flag T is set. If the answer to this question is "yes", then the program proceeds to the point 514. Otherwise, the program proceeds to the point 510 where a counter is cleared and then to the point 512 where the flag T is set to indicate that the counter has been cleared. Following this, the program proceeds to the point 524.

At the point 514 in the program, a determination is made as to whether or not the engine operating condition is steady. If the answer to this question is "yes", then the program proceeds to the point 516. Otherwise, it means that the engine is operating in a transient condition and the program proceeds to the point 524. At the point 516 in the program, a determination is made as to whether or not the count C of the counter, which is cleared at the point 510, exceeds a predetermined value C1. If the answer to this question is "yes", then the program proceeds to the point 524. Otherwise, the program proceeds to the point 518 where the counter is advanced and then to the point 520 where the value of the signal fed from the oxygen sensor 86 is read into the computer memory. Following this, the program proceeds to the point 524 where the computer program is returned to the entry point 502.

FIG. 11 is a flow diagram illustrating the programming of the digital computer as it is used to set the alcohol concentration related correction factor ALC in the event of failure of the alcohol concentration sensor 84 or its associated circuit.

The computer program is entered at the point 532. At the point 534 in the program, a determination is made as to whether or not the alcohol concentration sensor 84 or its associated circuit is subject to failure. This determination is made in such a manner as described in connection with the point 504 of the flow diagram of FIG. 10. If the answer to this question is "yes", then the program proceeds to the point 536. Otherwise, the program proceeds to the point 558 where the computer program is returned to the entry point 532.

At the point 536 in the program, a determination is made as to whether or not the alcohol concentration related correction factor ALC has been estimated for use in the event of failure of the alcohol concentration sensor 84 or its associated circuit. It is to be noted that the correction factor ALC may be estimated in such a manner as described in connection with FIGS. 4 and 5 or FIGS. 6 to 8. If the answer to this question is "yes", then the program proceeds to the point 538 where the correction factor ALC is set at the estimated value ALC2 and then to the point 558. Otherwise, the program proceeds to another determination step at the point 540. This determination is as to whether or not the first or second failure occurs. If the answer to this question is "yes", then the program proceeds to the point 542. Otherwise, the program proceeds to another determination point 544. This determination is as to whether or not a predetermined time, for example, 3 seconds, has been elapsed after a failure occurred in the alcohol concentration sensor 84 or its associated circuit. If the answer to this question is "yes", then the program proceeds to the point 546. Otherwise, the program proceeds to the point 554.

At the point 542 in the program, a determination is made as to whether or not the first failure occurs. If the answer to this question is "yes", then the program proceeds to the point 546. Otherwise, it means that the second failure occurs and the program proceeds to another determination step at the point 552. This determination is as to whether or not the value ALC3 of correction factor ALC calculated based upon the alcohol concentration sensor output is greater than the predetermined value ALC1, for example, 1.547 suitable for a gasoline/alcohol fuel blend containing 50% alcohol concentration. If the answer to this question is "yes", then the program proceeds to the point 554. Otherwise the program proceeds to the point 556.

At the point 546 in the program, a determination is made as to whether or not the air/fuel ratio is clamped on the lean or rich side with respect to its stoichiometric value. This determination is made by reference to the oxygen sensor output read at the point 520 of the flow diagram of FIG. 10. If the answer to this question is "yes", then the program proceeds to the point 548. Otherwise, the program proceeds to the point 554. At the point 548 in the program, a determination is made as to whether the air/fuel is clamped on the rich side. If the answer to this question is "yes", then the program proceeds to the point 550. Otherwise, it means that the air/fuel ratio is clamped on the lean side and the program proceeds to the point 552.

At the point 550 in the program, a determination is made as to whether or not the value ALC3 of the correction factor ALC calculated based upon the alcohol concentration sensor output is less than the predetermined value ALC1, for example, 1.547 suitable for a gasoline/alcohol fuel blend containing 50% alcohol concentration. If the answer to this question is "yes", then the program proceeds to the point 554. Otherwise, the program proceeds to the point 556.

At the point 554 in the program, the correction factor ALC is set at the value ALC3 calculated based upon the alcohol concentration sensor output. Following this the program proceeds to the point 558 where the computer program is returned to the entry point 532. At the point 556 in the program, the correction factor ALC is set at the predetermined value ALC1. Following this, the program proceeds to the point 558 where the computer program is returned to the entry point 532.

According to this embodiment, the alcohol concentration related correction factor ALC is set at an estimated value ALC2 in the event of failure of the alcohol concentration sensor or its associate circuit. When the correction factor ALC has not been estimated, the correction factor ALC is set at a selected one of a predetermined value ALC1, for example, 1.547 suitable for a gasoline/alcohol fuel blend containing 50% alcohol concentration and a value ALC3 calculated based upon the alcohol concentration sensor output. This selection is dependent upon the air/fuel ratio sensed from the oxygen sensor output read during steady engine operating conditions within a predetermined time after the alcohol concentration sensor 84 or its associated circuit is subject to failure. If the air/fuel ratio is on the lean side, the correction factor ALC is set at the calculated value ALC3 when the calculated value ALC3 is greater than the predetermined value ALC1 and at the predetermined value ALC1 when the calculated value ALC3 is less than the predetermined value ALC1 so as to prevent the air/fuel ratio to be further leaned out. On the other hand, if the air/fuel ratio is on the rich side, the correction factor ALC is set at the predetermined value ALC1 when the calculated value ALC3 is greater than the predetermined value ALC1 and at the calculated value ALC3 when the calculated value ALC3 is less than the predetermined value ALC1 so as to prevent the air/fuel ratio to be further enriched. The predetermined value, which is suitable for a gasoline/alcohol fuel blend containing 50% alcohol concentration, will provide a richest possible air/fuel mixture for the gasoline fuel containing 0% alcohol concentration and a leanest possible air/fuel mixture for the gasoline/alcohol fuel blend containing 85% alcohol concentration. It is, therefore, to start the engine even through the alcohol concentration changes after the vehicle is refueled.

A fourth embodiment of the fuel delivery control apparatus of the invention will be described in connection with FIG. 12.

Figure 12:
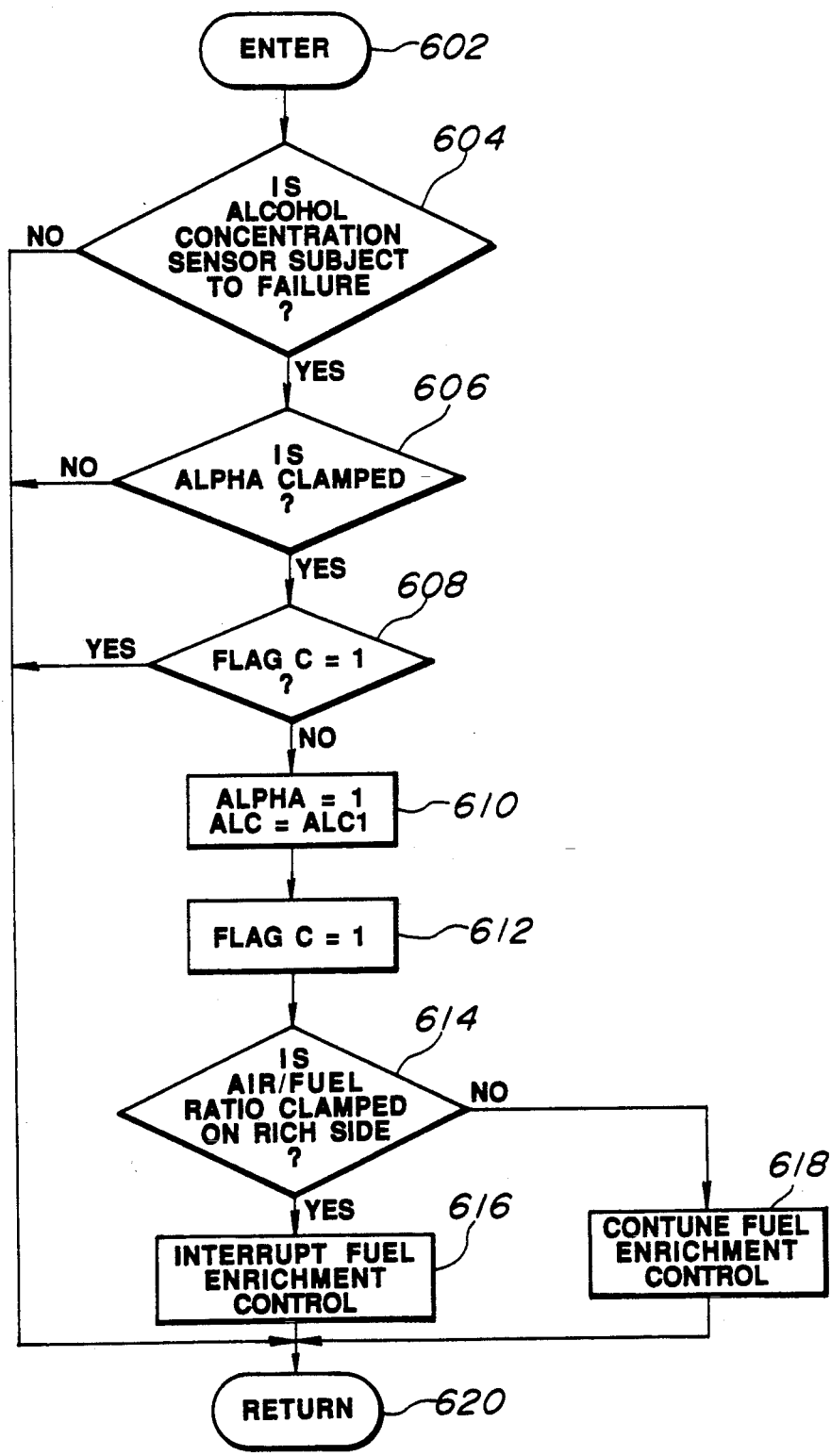
FIG. 12 is a flow diagram illustrating the programming of the digital computer used in a fourth embodiment of the fuel delivery control apparatus of the invention.

FIG. 12 is a flow diagram illustrating the programming of the digital computer as it is used to interrupt the fuel enrichment control in the event of failure of the alcohol concentration sensor 84 or its associated circuit.

The computer program is entered at the point 602. At the point 604 in the program, a determination is made as to whether or not the alcohol concentration sensor 84 or its associated circuit is subject to failure. For this purpose, the digital computer may be programmed to detect a failure in the alcohol concentration sensor 84 or its associated circuit when the time period during which the actual air/fuel ratio sensed by means of the oxygen sensor 86 is held clamped on the lean or rich side with respect to the stoichiometric value exceeds a predetermined time, or when the actual air/fuel ratio is on the lean side with respect to the stoichiometric value in spite of the fact that the engine is controlled to operate at an air/fuel ratio richer than the stoichiometric value, or when the alcohol concentration signal has a voltage value out of a predetermined acceptable range, or when the rate of change of the voltage value of the alcohol concentration signal is greater than a predetermined value. If the answer to this question is "yes", then the program proceeds to the point 606. Otherwise, the program proceeds to the point 620 where the computer program is returned to the entry point 602.

At the point 606 in the program, a determination is made as to whether or not the correction factor ALPHA, which is calculated based upon the oxygen sensor output, is clamped on the rich or lean side. If the answer to this question is "yes", then the program proceeds to the point 608. Otherwise, the program proceeds to the point 620.

At the point 608 in the program, a determination is made as to whether or not a flag C has been set. If the answer to this question is "yes", then the program proceeds to the point 620. Otherwise, the program proceeds to the point 610 where the correction factor ALPHA is set at 1 and the correction factor ALC is set at a predetermined value ALC1, for example, 1.547 suitable for a gasoline/alcohol fuel blend containing 50% alcohol concentration.

If the actual alcohol concentration is less than 50%, the air/fuel ratio will become richer than its stoichiometric value when the fuel delivery control is performed with the correction factor ALPHA being set at 1 and the correction factor ALC being set at the predetermined value ALC1 and the air/fuel ratio will be further enriched to an extent interfering with the engine operation when the fuel enrichment control is continued with the correction factor KMR being set at a value conventionally calculated as a function of engine speed and engine load. Such excess fuel enrichment can be avoided if the fuel enrichment control is interrupted by setting the correction factor KMR at 0.

On the other hand, if the actual alcohol concentration is greater than 50%, the actual air/fuel ratio will become leaner than the stoichiometric value so that the engine output will drop to an extent degrading the engine performance. Such excessive engine output drop can be avoided if the fuel enrichment control is continued with the correction factor KMR being set at a value conventionally calculated as a function of engine load and engine speed.

At the point 614 in the program, a determination is made as to whether or not the air/fuel ratio is clamped on the rich side with respect to its stoichiometric value. This determination is made by reference to the signal fed from the oxygen sensor 86. If the answer to this question is "yes", then the program proceeds to the point 616. Otherwise, the program proceeds to the point 618.

At the point 616 in the program, the fuel enrichment control is interrupted by setting the correction factor KMR at zero so as to perform the fuel delivery control without the use of the correction factor KMR. This is effective to prevent excessive air/fuel ratio enrichment even when the fuel has a small alcohol concentration. Following this, the program proceeds to the point 620 where the computer program is returned to the entry point 602.

At the point 618 in the program, the fuel enrichment control is continued by setting the correction factor KMR at a value conventionally calculated as a function of engine load and engine speed. Thus, the fuel delivery control is performed with the use of the calculated correction factor KMR. This is effective to avoid an excessive engine output drop even when the fuel has a great alcohol concentration. Following this, the program proceeds to the point 620 where the computer program is returned to the entry point 602.

A modified form of the fourth embodiment of the invention will be described with reference to FIGS. 13 to 16.

Figure 13:
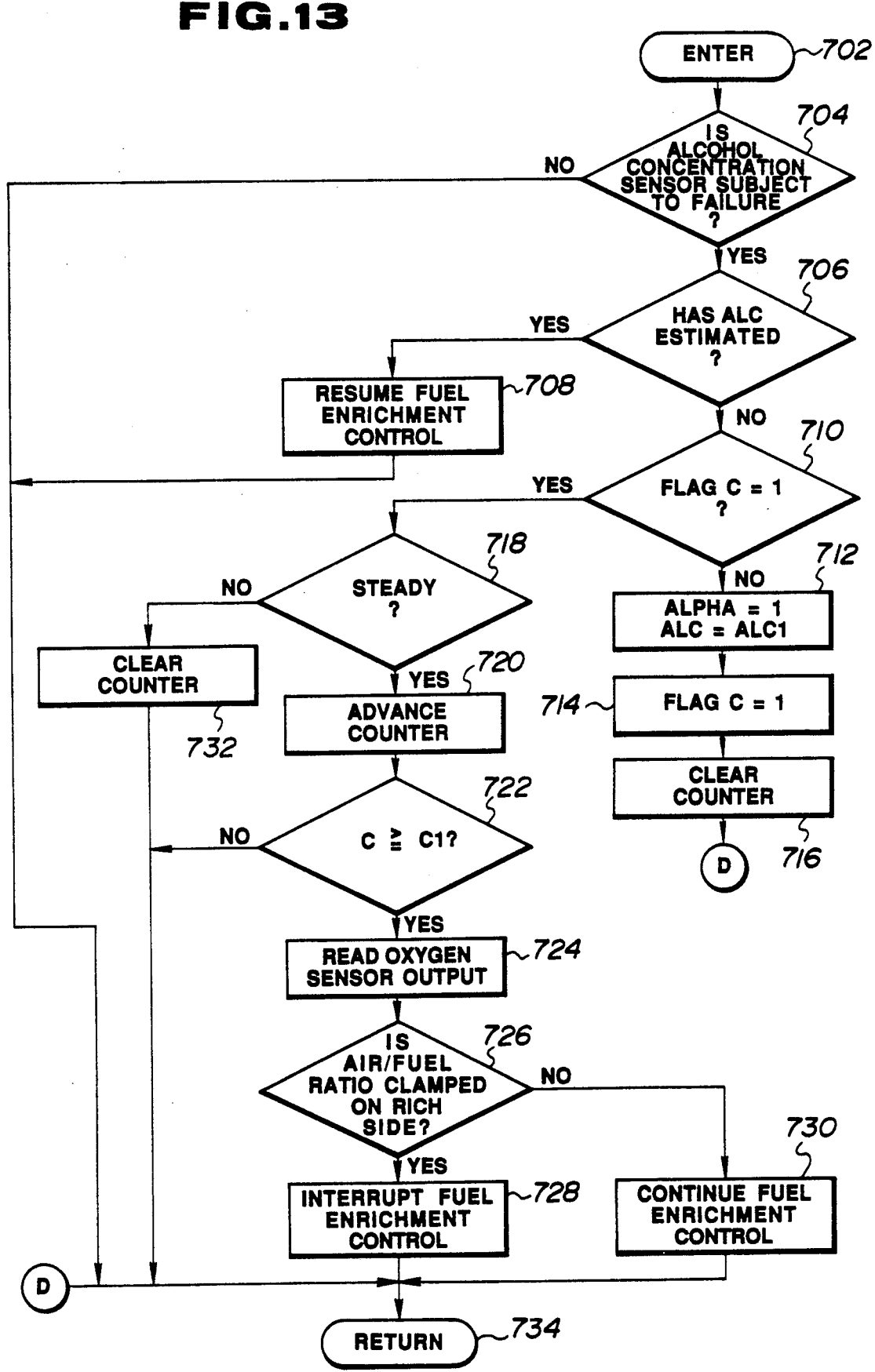
FIGS. 13 to 16 are flow diagram illustrating a modified form of the fourth embodiment of the invention.

FIG. 13 is a flow diagram illustrating the programming of the digital computer as it is used to interrupt the fuel enrichment control in the event of failure of the alcohol concentration sensor 84 or its associated circuit.

The computer program is entered at the point 702. At the point 704 in the program, a determination is made as to whether or not the alcohol concentration sensor 84 or its associated circuit is subject to failure. For this purpose, the digital computer may be programmed to detect a failure in the alcohol concentration sensor 84 or its associated circuit when the time period during which the actual air/fuel ratio sensed by means of the oxygen sensor 86 is held clamped on the lean or rich side with respect to the stoichiometric value exceeds a predetermined time, or when the actual air/fuel ratio is on the lean side with respect to the stiochiometric value in spite of the fact that the engine is controlled to operate at an air/fuel ratio richer than the stoichiometric value, or when the alcohol concentration signal has a voltage value out of a predetermined acceptable range, or when the rate of change of the voltage value of the alcohol concentration signal is greater than a predetermined value. If the answer to this question is "yes", then the program proceeds to the point 706. Otherwise, the program proceeds to the point 734 where the computer program is returned to the entry point 702.

At the point 706 in the program, a determination is made as to whether or not the correction factor ALC has been estimated. The estimation of the correction factor ALC will be described in connection with the flow diagrams of FIGS. 14 to 16. If the answer to this question is "yes", then the program proceeds to the point 708 where the fuel enrichment control is resumed by setting the correction factor KMR at a value calculated as a function of engine load and engine speed and then to the point 734. Otherwise, the program proceeds to another determination step at the point 710. This determination is as to whether or not a flag C has been set. If the answer to this question is "yes", then the program proceeds to the point 718. Otherwise, the program proceeds to the point 712 where the correction factor ALPHA is set at 1 and the correction factor ALC is clamped at a predetermined value ALC1, for example, 1.547 suitable for a gasoline/alcohol fuel blend containing 50% alcohol concentration. The flag C is set at the point 714 and a counter is cleared at the point 716. Following this, the program proceeds to the point 734.

At the point 718 in the program, a determination is made as to whether or not the engine operating condition is steady. If the answer to this question is "yes", then the program proceeds to the point 720. Otherwise, it means that the engine operating condition is transient and the program proceeds to the point 732 where the counter is cleared and the to the point 734. At the point 720, the counter is advanced. After the counter is advanced, the program proceeds to a determination step at the point 722. This determination is as to whether or not the count C of the counter exceeds a predetermined value C1 corresponding to a predetermined time, for example, 3 seconds, sufficient for the air/fuel ratio to be clamped on the lean or rich side. If the answer to this question is "yes", then the program proceeds to the point 724 where the value of the oxygen sensor output is read into the computer memory. Otherwise, the program proceeds to the point 734.

At the point 726 in the program, a determination is made as to whether or not the air/fuel ratio is clamped on the rich side with respect to its stoichiometric value. This determination is made by reference to the value read at the point 724. If the answer to this question is "yes", then the program proceeds to the point 728. Otherwise, the program proceeds to the point 730.

At the point 728 in the program, the fuel enrichment control is interrupted by setting the correction factor KMR at zero so as to perform the fuel delivery control without the use of the correction factor KMR. This is effective to prevent excessive air/fuel ratio enrichment even when the fuel has a small alcohol concentration. Following this, the program proceeds to the point 734 where the computer program is returned to the entry point 702.

At the point 730 in the program, the fuel enrichment control is continued by setting the correction factor KMR at a value calculated as a function of engine load and engine speed. Thus, the fuel delivery control is performed with the use of the correction factor KMR. This is effective to avoid an excessive engine output drop even when the fuel has a great alcohol concentration. Following this, the program proceeds to the point 734 where the computer program is returned to the entry point 702.

Figure 14:
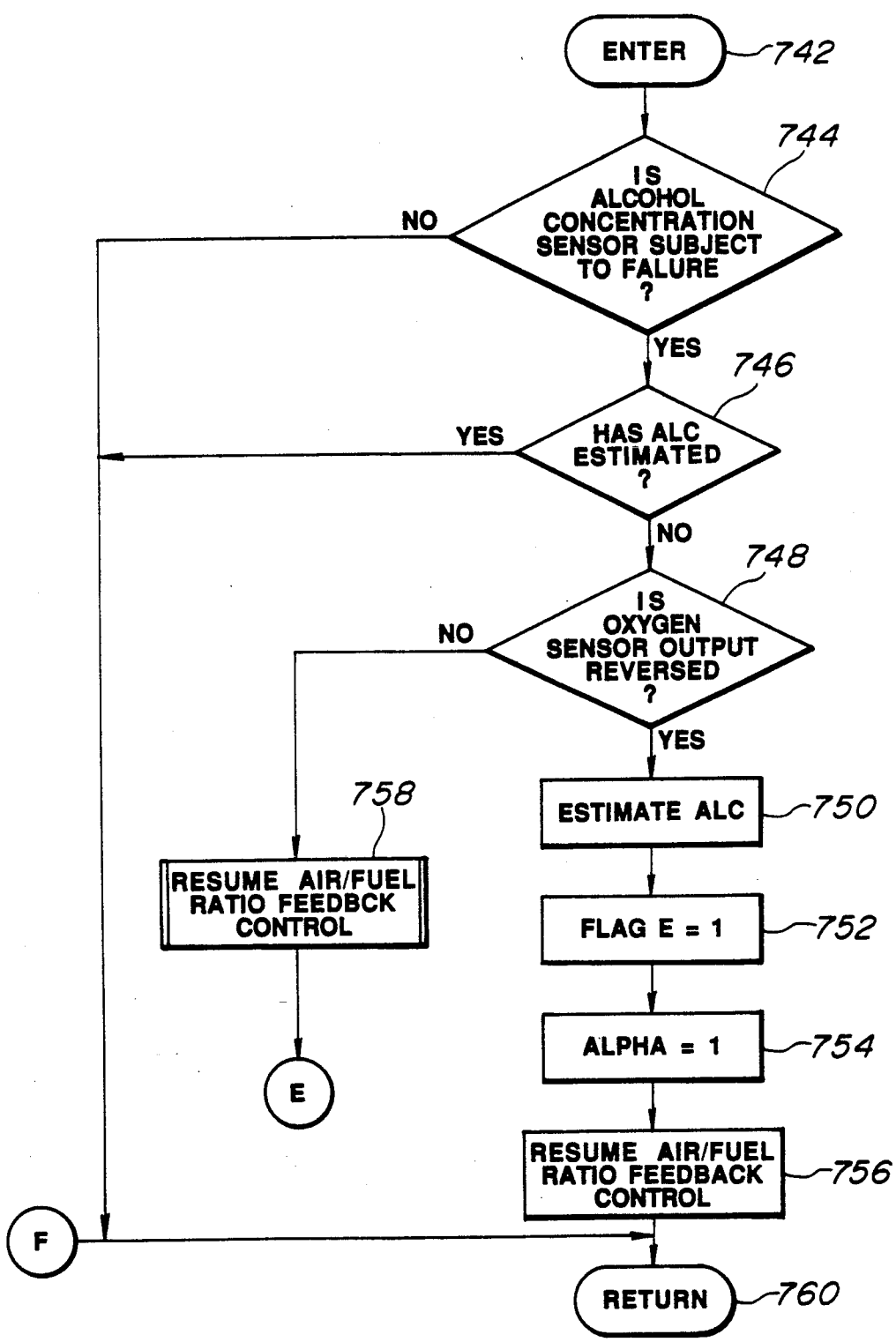
Figure 15:
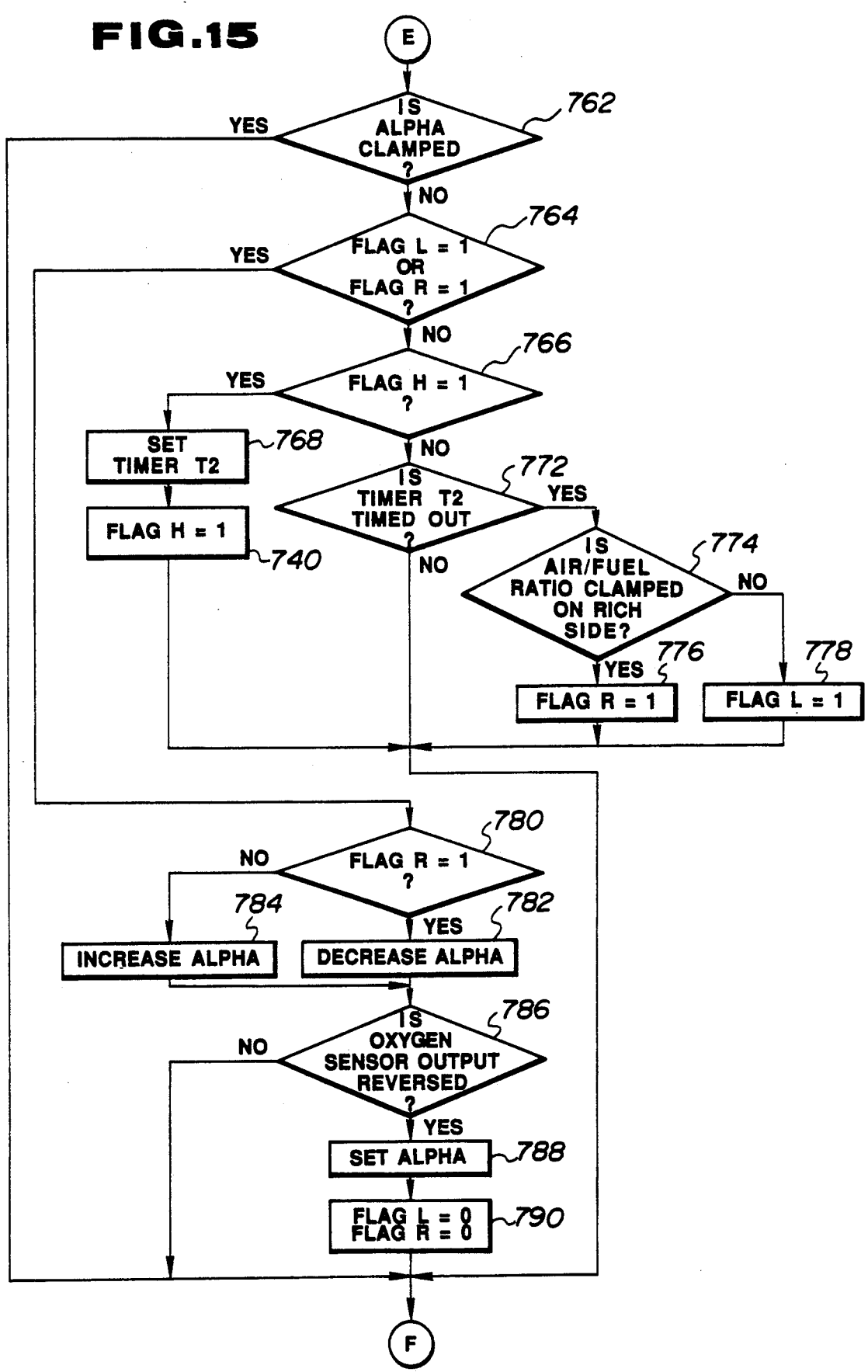

FIGS. 14 and 15 are flow diagrams illustrating the programming of the digital computer as it is used to estimate the alcohol concentration related correction factor ALC in the event of failure of the alcohol concentration sensor 84 or its associated circuit.

The computer program is entered at the point 742. At the point 704 in the program, a determination is made as to whether or not the alcohol concentration sensor 84 or its associated circuit is subject to failure. This determination is made in such a manner as described in connection with the point 704 of the flow diagram of FIG. 13. If the answer to this question is "yes", then the program proceeds to the point 746. Otherwise, the program proceeds to the point 760 where the computer program is returned to the entry point 742.

At the point 746 in the program, a determination is made as to whether or not a flag E has been set. If the answer to this question is "yes", then it means that the alcohol concentration related correction factor ALC has been estimated and the program proceeds to the point 760. Otherwise, the program proceeds to another determination step at the point 748. This determination is as to whether or not the oxygen sensor output reverses or changes between its low and high levels. If the answer to this question is "yes", then it means that the conditions for estimation of the correction factor ALC are fulfilled and the program proceeds to the point 750. Otherwise, the program proceeds to the point 758 where the air/fuel ratio feedback control is resumed and then to the point 762 (FIG. 15).

At the point 750 in the program, the correction factor ALC is estimated. This estimation will be described in connection with the flow diagram of FIG. 16. At the point 752, the flag E is set to indicate that the correction factor ALC has been estimated. Following this, the program proceeds to the point 754 where the correction factor ALPHA is initiated to 1 and then to the point 756 where the closed loop air/fuel ratio feedback control is resume. After the closed loop air/fuel ratio feedback control is resumed, the program proceeds to the point 760 where the computer program is returned to the entry point 742.

At the point 762 (FIG. 15) in the program, a determination is made as to whether or not the correction factor ALPHA, which is calculated based on the oxygen sensor output, is clamped on the lean or rich side. If the answer to this question is "yes", then the program proceeds to the point 760 (FIG. 14). Otherwise, the program proceeds to another determination step at the point 764. This determination is as to whether or not a flag L or a flag R has been set. If the answer to this question is "yes", then the program proceeds to the point 780. Otherwise, the program proceeds to another determination step at the point 766. This determination is as to whether or not a flag H has been set. If the answer to this question is "yes", then it means that a timer has been set and the program proceeds to the point 772. Otherwise, the program proceeds to the point 768 where the timer is set at a predetermined time, for example, 5 seconds, sufficient for the air/fuel ratio to be clamped on the lean or rich side with respect to its stoichiometric value and then to the point 760 (FIG. 14).

At the point 772 in the program, a determination is made as to whether or not the time is timed out. If the answer to this question is "yes", then it means that the predetermined time set at the point 768 has been elapsed and the program proceeds to the point 774. Otherwise, the program proceeds to the point 760 (FIG. 14).

At the point 774 in the program, a determination is made as to whether or not the air/fuel ratio is clamped on the rich side. If the answer to this question is "yes", then the program proceeds to the point 776 where the flag R is set to indicate that the air/fuel ratio has been clamped on the rich side with respect to its stoichiometric value and then to the point 760 (FIG. 14). Otherwise, the program proceeds to the point 778 where the flag L is set to indicate that the air/fuel ratio has been clamped on the lean side with respect to its stoichiometric value and then to the point 760 (FIG. 14).

At the point 780 in the program, a determination is made as to whether or not the flag R has been set. If the answer to this question is "yes", then it means that the air/fuel ratio has been clamped on the rich side with respect to its stoichiometric value and the program proceeds to the point 782 where the correction factor ALPHA is decreased to lean out the air/fuel ratio by subtracting a predetermined value from the last value of the correction factor ALPHA and then to the point 786. Otherwise, it means that the air/fuel ratio has been clamped on the lean side with respect to its stoichiometric value and the program proceeds to the point 784 where the correction factor ALPHA is increased to enrich the air/fuel ratio by adding the predetermined value from the last value of the correction factor ALPHA and then to the point 786.

At the point in the program 786, a determination is made as to whether or not the oxygen sensor output reverses. If the answer to this question is "yes", then the program proceeds to the point 788. Otherwise, the program proceeds to the point 760 (FIG. 14). At the point 788 in the program, the correction factor ALPHA is set at a value obtained when the oxygen sensor output reverses at the point 786. At the point 790 in the program, the flags L and R are cleared. Following this, the program proceeds to the point 760 (FIG. 14).

The program sequence from the point 780 to the point 786 is repeated with the correction factor ALPHA being increased or decreased by the predetermined value in each cycle of execution of the repeated program sequence until the oxygen sensor output reverses or changes between the low and high level at the point 786.

Figure 16:
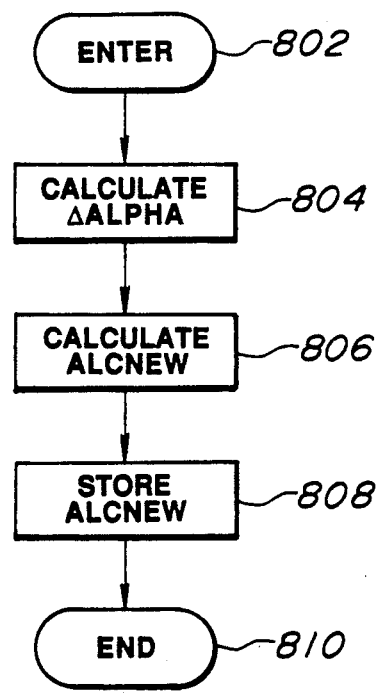

FIG. 16 is a flow diagram illustrating the programming of the digital computer as it is used to estimate the correction factor ALC in the event of failure of the alcohol concentration sensor or its associated circuit.

The computer program is entered at the point 802 which corresponds to the point 748 of the flow diagram of FIG. 14. At the point 802 in the program, the central processing unit calculates a difference $\Delta$ALPHA of the value ALPHA1 of the correction factor ALPHA obtained when the oxygen sensor output reverses (point 786) from the ALPHA2 (=1) of the correction factor ALC set at the point 712 of the flow diagram of FIG. 13.

At the point 806 in the program, the central processing unit calculates a new value ALCNEW for the correction factor ALC based on the calculated difference $\Delta$ALPHA and the last value ALCOLD of the correction factor ALC as $$ALCNEW = ALCOLD + ALCOLD \times \Delta ALPHA$$

At the point 808 in the program, the calculated new value ALCNEW (estimated value ALC2) is stored in the computer memory. Following this, the program proceeds to the end point 810 which corresponds to the point 752 of the flow diagram of FIG. 14.

What is claimed is:

1. A fuel delivery control apparatus for use with an internal combustion engine operable on either of gasoline fuel and gasoline/alcohol fuel blend, the fuel delivery control apparatus comprising an alcohol concentration sensor sensitive to an alcohol concentration of the fuel to be delivered to the engine for producing an alcohol concentration signal indicative of a sensed alcohol concentration, an oxygen sensor sensitive to an oxygen content of exhaust gases discharged from the engine for producing an air/fuel ratio feedback signal, and a control unit coupled to the alcohol concentration sensor and the oxygen sensor for controlling the amount of fuel metered to the engine based upon engine operating conditions, the control unit including first means for setting a first correction factor at a value calculated based upon the alcohol concentration signal to correct the amount of fuel metered to the engine, second means for setting a second correction factor based upon the air/fuel ratio feedback signal to correct the amount of fuel metered to the engine so as to provide an air/fuel ratio feedback control, third means responsive to failure in the alcohol concentration sensor for producing a failure signal, and fourth means operable in response to the failure signal, the fourth means including:

means for modifying the first correction factor based upon the air/fuel ratio feedback signal to estimate a value of the first correction factor;

means for calculating a difference between the calculated and estimated values of the first correction factor; and means for setting the first correction factor at the estimated value to correct the amount of fuel metered to the engine when the calculated difference is out of a predetermined range and at the calculated value to correct the amount of fuel metered to the engine when the calculated difference is within the acceptable range.

2. The fuel delivery control apparatus as claimed in claim 1, wherein the fourth means includes:

means for setting the first correction factor at a first predetermined value while clamping the second correction factor at a second predetermined value to clamp the air/fuel ratio feedback signal in one of a first state representing a rich air/fuel mixture and a second state representing a lean air/fuel mixture;

means for decreasing the first correction factor when the air/fuel ratio feedback signal is clamped in the first state and increasing the first correction factor when the air/fuel ratio feedback signal is clamped in the second state; and means for setting the estimated value of the first correction factor at a value obtained when the air/fuel ratio feedback signal changes between the first and second states.

3. The fuel delivery control apparatus as claimed in claim 2, wherein the first predetermined value is suitable for a gasoline/alcohol fuel blend containing 50% alcohol concentration and the second predetermined value is 1.

4. The fuel delivery control apparatus as claimed in claim 3, wherein the fourth means includes means for setting the first correction factor at the first predetermined value before the estimated value of the first correction factor is set.

5. The fuel delivery control apparatus as claimed in claim 1, wherein the fourth means includes:

means for setting the second correction factor at a second predetermined value while clamping the first correction factor at a first predetermined value to clamp the air/fuel ratio feedback signal in one of a first state representing a rich air/fuel mixture and a second state representing a lean air/fuel mixture;

means for decreasing the second correction factor when the air/fuel ratio feedback signal is clamped in the first state and increasing the second correction factor when the air/fuel ratio feedback signal is clamped in the second state;

means for detecting a value of the second correction factor when the air/fuel ratio feedback signal changes between the first and second states; and means for calculating a difference $\Delta ALPHA$ of the detected value of the second correction factor from the second predetermined value of the second correction factor; and means for setting the estimated value of the first correction factor at a value ALCNEW calculated as $$ALCNEW = ALCOLD + ALCOLD \times \Delta ALPHA$$

where ALCOLD is the first predetermined value of the first correction factor.

6. The fuel delivery control apparatus as claimed in claim 5, wherein the first predetermined value is suitable for a gasoline/alcohol fuel blend containing 50% alcohol concentration and the second predetermined value is 1.

7. The fuel delivery control apparatus as claimed in claim 6, wherein the fourth means includes means for setting the first correction factor at the first predetermined value before the estimated value of the first correction factor is set.

8. A fuel delivery control apparatus for use with an internal combustion engine operable on either of gasoline fuel and gasoline/alcohol fuel blend, the fuel delivery control apparatus comprising an alcohol concentration sensor sensitive to an alcohol concentration of the fuel to be delivered to the engine for producing an alcohol concentration signal indicative of a sensed alcohol concentration, an oxygen sensor sensitive to an oxygen content of exhaust gases discharged from the engine for producing an air/fuel ratio feedback signal, a starter switch turned on when the engine is cranked, and a control unit coupled to the alcohol concentration sensor and the oxygen sensor for controlling the amount of fuel metered to the engine based upon engine operating conditions, the control unit including first means for setting a first correction factor at a value calculated based upon the alcohol concentration signal to correct the amount of fuel metered to the engine, second means for setting a second correction factor based upon the air/fuel ratio feedback signal to correct the amount of fuel metered to the engine so as to provide an air/fuel ratio feedback control, third means responsive to failure in the alcohol concentration sensor for producing a failure signal, and fourth means operable in response to the failure signal, the fourth means including:

means for modifying the first correction factor based upon the air/fuel ratio feedback signal to estimate a value of the first correction factor; and means for setting the first correction factor at the estimated value to correct the amount of fuel metered to the engine before a predetermined time is elapsed after the starter switch is turned on and at a predetermined value to correct the amount of fuel metered to the engine after the predetermined time is elapsed after the starter switch is turned on.

9. The fuel delivery control apparatus as claimed in claim 8, wherein the predetermined time is a time required for fuel to travel from a fuel tank to a fuel injector through which fuel is delivered to the engine.

10. The fuel delivery control apparatus as claimed in claim 9, wherein the predetermined value of the first correction factor is suitable for a gasoline/alcohol fuel blend containing 50% alcohol concentration.

11. The fuel delivery control apparatus as claimed in claim 8, wherein the fourth means includes:

means for setting the first correction factor at a first predetermined value while clamping the second correction factor at a second predetermined value to clamp the air/fuel ratio feedback signal in one of a first state representing a rich air/fuel mixture and a second state representing a lean air/fuel mixture;

means for decreasing the first correction factor when the air/fuel ratio feedback signal is clamped in the first state and increasing the first correction factor when the air/fuel ratio feedback signal is clamped in the second state; and means for setting the estimated value of the first correction factor at a value obtained when the air/fuel ratio feedback signal changes between the first and second states.

12. The fuel delivery control apparatus as claimed in claim 11, wherein the first predetermined value is suitable for a gasoline/alcohol fuel blend containing 50% alcohol concentration and the second predetermined value is 1.

13. The fuel delivery control apparatus as claimed in claim 12, wherein the fourth means includes means for setting the first correction factor at the first predetermined value before the estimated value of the first correction factor is set.

14. The fuel delivery control apparatus as claimed in claim 8, wherein the fourth means includes:

means for setting the second correction factor at a second predetermined value while clamping the first correction factor at a first predetermined value to clamp the air/fuel ratio feedback signal in one of a first state representing a rich air/fuel mixture and a second state representing a lean air/fuel mixture;

means for decreasing the second correction factor when the air/fuel ratio feedback signal is clamped in the first state and increasing the second correction factor when the air/fuel ratio feedback signal is clamped in the second state;

means for detecting a value of the second correction factor when the air/fuel ratio feedback signal changes between the first and second states; means for calculating a difference $\Delta ALPHA$ of the detected value of the second correction factor from the second predetermined value of the second correction factor; and means for setting the estimated value of the first correction factor at a value ALCNEW calculated as $ALCNEW = ALCOLD + ALCOLD \times \Delta ALPHA$ where ALCOLD is the first predetermined value of the first correction factor.

15. The afuel delivery control apparatus as claimed in claim 14, wherein the first predetermined value is suitable for a gasoline/alcohol fuel blend containing 50% alcohol concentration and the second predetermined value is 1.

16. The fuel delivery control apparatus as claimed in claim 15, wherein the fourth means includes means for setting the first correction factor at the first predetermined value before the estimated value of the first correction factor is set.

17. A fuel delivery control apparatus for use with an internal combustion engine operable on either of gasoline fuel and gasoline/alcohol fuel blend, the fuel delivery control apparatus comprising an alcohol concentration sensor sensitive to an alcohol concentration of the fuel to be delivered to the engine for producing an alcohol concentration signal indicative of a sensed alcohol concentration, an oxygen sensor sensitive to an oxygen content of exhaust gases discharged from the engine for producing an air/fuel ratio feedback signal, and a control unit coupled to the alcohol concentration sensor and the oxygen sensor for controlling the amount of fuel metered to the engine based upon engine operating conditions, the control unit including first means for setting a first correction factor at a value calculated based upon the alcohol concentration signal to correct the amount of fuel metered to the engine, second means for setting a second correction factor based upon the air/fuel ratio feedback signal to correct the amount of fuel metered to the engine so as to provide an air/fuel ratio feedback control, third means responsive to failue in the alcohol concentration sensor for producing a failure signal, and fourth means operable in response to the failure signal, the fourth means including:

means for detecting the air/fuel ratio feedback signal clamped in a first state representing a rich air/fuel mixture to produce a rich signal;

means for detecting the air/fuel ratio feedback signal clamped in a second state representing a lean air/fuel mixture to produce a lean signal;

means for comparing the calculated value of the first correction factor with a predetermined value;

means responsive to the rich signal for setting the first correction factor at the calculated value to correct the amount of fuel metered to the engine when the calculated value of the first correction factor is less than the predetermined value and at the predetermined value when the calculated value of the first correction factor exceeds the predetermined value; and means responsive to the lean signal for setting the first correction factor at the calculated value to correct the amount of fuel metered to the engine when the calculated value of the first correction factor exceeds the predetermine value and at the predetermined time when the calculated value of the first correction factor is less than the predetermined value.

18. The fuel delivery control apparatus as claimed in claim 17, wherein the predetermined value of the first correction factor is suitable for a gasoline/alcohol fuel blend containing 50% alcohol concentration.

19. The fuel delivery control apparatus as claimed in claim 17, wherein the fourth means includes means for modifying the first correction factor base upon the air/fuel ratio feedback signal to estimate a value of the first correction factor.

20. The fuel delivery control apparatus as claimed in claim 19, wherein the fourth means includes means for setting the first correction factor at the estimated value to correct the amount of fuel metered to the engine after the first correction factor is estimated.

21. The fuel delivery control apparatus as claimed in claim 20, wherein the fourth means includes:

means for setting the first correction factor at a first predetermined value while clamping the second correction factor at a second predetermined value to clamp the air/fuel ratio feedback signal in one of a first state representing a rich air/fuel mixture and a second state representing a lean air/fuel mixture;

means for decreasing the first correction factor when the air/fuel ratio feedback signal is clamped in the first state and increasing the first correction factor when the air/fuel ratio feedback signal is clamped in the second state; and means for setting the estimated value of the first correction factor at a value obtained when the air/fuel ratio feedback signal changes between the first and second states.

22. The fuel delivery control apparatus as claimed in claim 21, wherein the first predetermined value is suitable for a gasoline/alcohol fuel blend containing 50% alcohol concentration and the second predetermined value is 1.

23. The fuel delivery control apparatus as claimed in claim 20, wherein the fourth means includes:
   means for setting the second correction factor at a second predetermined value while clamping the first correction factor at a first predetermined value to clamp the air/fuel ratio feedback signal in one of a first state representing a rich air/fuel mixture and a second state representing a lean air/fuel mixture;
   means for decreasing the second correction factor when the air/fuel ratio feedback signal is clamped in the first state and increasing the second correction factor when the air/fuel ratio feedback signal is clamped in the second state;
   means for detecting a value of the second correction factor when the air/fuel ratio feedback signal changes between the first and second states; and
   means for calculating a difference ΔALPHA of the detected value of the second correction factor from the second predetermined value of the second correction factor; and
   means for setting the estimated value of the first correction factor at a value ALCNEW calculated as ALCNEW=ALCOLD+ALCOLD×ΔALPHA where ALCOLD is the first predetermined value of the first correction factor.

24. The fuel delivery control apparatus as claimed in claim 23, wherein the first predetermined value is suitable for a gasoline/alcohol fuel blend containing 50% alcohol concentration and the second predetermined value is 1.

25. A fuel delivery control apparatus for use with an internal combustion engine operable on either of gasoline fuel and gasoline/alcohol fuel blend, the fuel delivery control apparatus comprising an alcohol concentration sensor sensitive to an alcohol concentration of the fuel to be delivered to the engine for producing an alcohol concentration signal indicative of a sensed alcohol concentration, an oxygen sensor sensitive to an oxygen content of exhaust gases discharged from the engine for producing an air/fuel ratio feedback signal, and a control unit coupled to the alcohol concentration sensor and the oxygen sensor for controlling the amount of fuel metered to the engine based upon engine operating conditions, the control unit including first means for setting a first correction factor at a value calculated based upon the alcohol concentration signal to correct the amount of fuel metered to the engine, second means for setting a second correction factor based upon the air/fuel ratio feedback signal to correct the amount of fuel metered to the engine so as to provide an air/fuel ratio feedback control, third means for setting a third correction factor based upon engine operating conditions to correct the amount of fuel metered to the engine so as to provide a fuel enrichment control, fourth means responsive to failure in the alcohol concentration sensor for producing a failure signal, and fifth means operable in response to the failure signal, the fifth means including:
   means for clamping the first correction factor at a first predetermined value to clamp the air/fuel ratio feedback signal in one of a first state representing a rich air/fuel mixture and a second state representing a lean air/fuel mixture; and
   means for interrupting the fuel enrichment control when the air/fuel ratio feedback signal clamped in the first state.

26. A fuel delivery control apparatus for use with and internal combustion engine operable on either of gasoline fuel and gasoline/alcohol fuel blend, the fuel delivery control apparatus comprising an alcohol concentration sensor sensitive to an alcohol concentration of the fuel to be delivered to the engine for producing an alcohol concentration signal indicative of a sensed alcohol concentration, an oxygen sensor sensitive to an oxygen content of exhaust gases discharged from the engine for producing an air/fuel ratio feedback signal, and a control unit coupled to the alcohol concentration sensor and the oxygen sensor for controlling the amount of fuel metered to the engine based upon engine operating conditions, the control unit including first means for setting a first correction factor at a value calculated based upon the alcohol concentration signal to correct the amount of fuel metered to the engine, second means for setting a second correction factor based upon the air/fuel ratio feedback signal to correct the amount of fuel metered to the engine so as to provide an air/fuel ratio feedback control, third means for setting a third correction factor based upon engine operating conditions to correct the amount of fuel metered to the engine so as to provide a fuel enrichment control, fourth means responsive to failure in the alcohol concentration sensor for producing a failure signal, and fifth means operable in response to the failure signal, the fifth means including:
   means for setting the first correction factor at a first predetermined value while clamping the second correction factor at a second predetermined value to clamp the air/fuel ratio feedback signal in one of a first state representing a rich air/fuel mixture and a second state representing a lean air/fuel mixture;
   means for interrupting the fuel enrichment control when the air/fuel ratio feedback signal clamped in the first state;
   means for decreasing the first correction factor when the air/fuel ratio feedback signal is clamped in the first state and increasing the first correction factor when the air/fuel ratio feedback signal is clamped in the second state; and
   means for setting the first correction factor at an estimated value obtained when the air/fuel ratio feedback signal changes between the first and second states.

27. The fuel delivery control apparatus as claimed in claim 26, wherein the first predetermined value is suitable for a gasoline/alcohol fuel blend containing 50% alcohol concentration and the second predetermined value is 1.

28. The fuel delivery control apparatus as claimed in claim 26, wherein the fuel enrichment control is resumed after the first correction factor is set at the estimated value.

29. A fuel delivery control apparatus for use with an internal combustion engine operable on either of gasoline fuel and gasoline/alcohol fuel blend, the fuel delivery control apparatus comprising an alcohol concentration sensor sensitive to an alcohol concentration of the fuel to be delivered to the engine for producing an alcohol concentration signal indicative of a sensed alcohol concentration, an oxygen sensor sensitive to an oxygen content of exhaust gases discharged from the engine for producing an air/fuel ratio feedback signal, and a control unit coupled to the alcohol concentration sensor and the oxygen sensor for controlling the amount of fuel metered to the engine based upon engine operating conditions, the control unit including first means for setting a first correction factor at a value calculated based upon the alcohol concentration signal to correct the amount of fuel metered to the engine, second means for setting a second correction factor based upon the air/fuel ratio feedback signal to correct the amount of fuel metered to the engine so as to provide an air/fuel ratio feedback control, third means for setting a third correction factor based upon engine operating conditions to correct the amount of fuel metered to the engine so as to provide a fuel enrichment control, fourth means responsive to failure in the alcohol concentration sensor for producing a failure signal, and fifth means operable in response to the failure signal, the fifth means including:

means for setting the second correction factor at a second predetermined value while clamping the first correction factor at a first predetermined value to clamp the air/fuel ratio feedback signal in one of a first state representing a rich air/fuel mixture and a second state representing a lean air/fuel mixture;

means for interrupting the fuel enrichment control when the air/fuel ratio feedback signal clamped in the first state;

means for decreasing the second correction factor when the air/fuel ratio feedback signal is clamped in the first state and increasing the second correction factor when the air/fuel ratio feedback signal is clamped in the second state;

means for detecting a value of the second correction factor when the air/fuel ratio feedback signal changes between the first and second states;

means for calculating a difference $\Delta ALPHA$ of the detected value of the second correction factor from the second predetermined value of the second correction factor; and means for setting the estimated value of the first correction factor at a value ALCNEW calculated as $ALCNEW = ALCOLD + ALCOLD \times \Delta ALPHA$ where ALCOLD is the first predetermined value of the first correction factor.

30. The fuel delivery control apparatus as claimed in claim 29, wherein the first predetermined value is suitable for a gasoline/alcohol fuel blend containing 50% alcohol concentration and the second predetermined value is 1.

31. The fuel delivery control apparatus as claimed in claim 29, wherein the fuel enrichment control is resumed after the first correction factor is set at the estimated value.

* * * * *